(12) United States Patent
Mizushima et al.

(10) Patent No.: US 7,749,316 B2
(45) Date of Patent: Jul. 6, 2010

(54) WATER-BASED INKS FOR INK-JET PRINTING

(75) Inventors: Ryuma Mizushima, Wakayama (JP); Hiroyuki Yoshida, Wakayama (JP); Isao Tsuru, Wakayama (JP); Yusuke Shimizu, Wakayama (JP)

(73) Assignee: Kao Corporation, Tokyo (JP)

( * ) Notice: Subject to any disclaimer, the term of this patent is extended or adjusted under 35 U.S.C. 154(b) by 720 days.

(21) Appl. No.: 11/701,452

(22) Filed: Feb. 2, 2007

(65) Prior Publication Data
US 2008/0028981 A1    Feb. 7, 2008

(30) Foreign Application Priority Data
Feb. 8, 2006 (JP) .............................. 2006-030885
Aug. 9, 2006 (JP) .............................. 2006-216927

(51) Int. Cl.
C09D 11/00 (2006.01)
(52) U.S. Cl. .................... 106/31.6; 106/31.65
(58) Field of Classification Search ............. 106/31.27, 106/31.6, 31.33, 31.65
See application file for complete search history.

(56) References Cited

U.S. PATENT DOCUMENTS

| | | | |
|---|---|---|---|
| 5,688,311 A | | 11/1997 | Adamic |
| 5,889,083 A | * | 3/1999 | Zhu .............................. 523/161 |
| 7,307,110 B2 | * | 12/2007 | Yatake ......................... 523/160 |
| 2003/0021983 A1 | * | 1/2003 | Nohr et al. ................... 428/327 |
| 2004/0009294 A1 | * | 1/2004 | Kuribayashi et al. ........ 427/212 |
| 2005/0004261 A1 | | 1/2005 | Yatake |

FOREIGN PATENT DOCUMENTS

DE    10048797 A1    4/2002

* cited by examiner

Primary Examiner—Jerry Lorengo
Assistant Examiner—Veronica Faison Gee
(74) Attorney, Agent, or Firm—Birch, Stewart, Kolasch & Birch, LLP

(57) ABSTRACT

The present invention relates to a water dispersion for ink-jet printing, including a colorant, particles (A) (except for pigments) having a refractive index of 1.0 to 2.2, and a nonionic organic compound containing a saturated or unsaturated hydrocarbon group having 8 to 30 carbon atoms, and exhibiting a solubility of 1 g or less in 100 g of water as measured at 25° C., as well as a water based ink containing the water dispersion. There are provided a water-based ink for ink-jet printing which can exhibit a high optical density upon one-pass printing on plain papers and, therefore, is suitable for high-speed printing, as well as a water dispersion used in the water-based ink.

6 Claims, 2 Drawing Sheets

WATER-BASED INKS FOR INK-JET PRINTING

FIELD OF THE INVENTION

The present invention relates to water-based inks for ink-jet printing and water dispersions used in the water-based inks.

BACKGROUND OF INVENTION

In ink-jet printing methods, droplets of ink are directly projected onto a recording medium from very fine nozzles and allowed to adhere to the recording medium, to form characters and image. The ink-jet printing methods have been rapidly spread because of their various advantages such as easiness of full coloration, low costs, capability of using a plain paper as the recording medium, non-contact with printed images and characters, etc.

As to the ink-jet printing methods, for example, W 01/096483 discloses an ink for ink-jet printing which contains a colorant formed by coating a pigment and/or a dye with a polymer, water, and at least one compound selected from the group consisting of an acetylene glycol-based surfactant, an acetylene alcohol-based surfactant, a glycol ether and a 1,2-alkylene glycol, exhibits excellent dispersion stability and ejection stability, and is capable of providing images which are excellent in color developability, etc.

JP 2003-096345A discloses a pigment-containing ink for ink-jet printing which is composed of a polymer emulsion containing polymer fine particles into which a water-insoluble or hardly-soluble colorant is included, and which also contains at least a wetting agent such as glycerol, 1,3-butanediol, 1,6-hexanediol and 1,5-pentanediol as well as a polyol or a glycol ether having 8 to 11 carbon atoms, an anionic or nonionic surfactant, a water-soluble organic solvent and water, wherein the ink has a viscosity of 5 mPa·s or more as measured at 25° C., is excellent in ejection stability and storage stability, and is capable of providing printed images having good quality, etc., even upon high-speed printing on plain papers.

JP 2004-91590A discloses a water-based pigment dispersion containing a pigment, a water-soluble organic solvent and a copolymer resin obtained from a styrene monomer and an acid group-containing monomer wherein a content of the styrene monomer component in the copolymer resin is 50 to 90% by weight, and the dispersion further contains inorganic oxide fine particles in an amount of 0.01 to 10% by weight on the basis of the weight of the pigment.

However, the above conventional water-based inks are still unsatisfactory in optical density when conducting one-pass ink-jet printing on plain papers using the inks.

SUMMARY OF THE INVENTION

The present invention relates to the following aspects [1] to [3]:

[1] A water dispersion for ink-jet printing, including a colorant, particles (A) (except for pigments) having a refractive index of 1.0 to 2.2, and a nonionic organic compound containing a saturated or unsaturated hydrocarbon group having 8 to 30 carbon atoms, and exhibiting a solubility of 1 g or less in 100 g of water as measured at 25° C.;

[2] A water-based ink for ink-jet printing including the water dispersion as defined in the above aspect [1]; and

[3] A water-based ink for ink-jet printing, including a colorant, particles (A) (except for pigments) having a refractive index of 1.0 to 2.2 and a nonionic organic compound, wherein a surface tension ($\gamma$) and a contact angle ($\theta$) of the water-based ink as measured by the following methods, satisfy the following formulae (1) and (2):

$$15 \leq \gamma \cos\theta \leq 27 \tag{1}$$

$$0.1 \leq \gamma(1 \cdot \cos\theta) \leq 1.3 \tag{2},$$

Method of Measuring the Surface Tension ($\gamma$):

Using a surface tension meter "CBVP-2" (tradename) available from Kyowa Interface Science Co., Ltd., a platinum plate was immersed in 5 g of the water-based ink filled in a cylindrical polyethylene container (3.6 cm in diameter×1.2 cm in depth) to measure a surface tension of the water-based ink at 25° C.;

Method of Measuring the Contact Angle ($\theta$):

Using a static contact angle meter "CA-A" (tradename) (using a capillary having an inner diameter of 0.4 mm) available from Kyowa Interface Science Co., Ltd., about 2.4 μL of the water-based ink was contacted with a recording medium (plain paper "4024" (tradename) available from Xerox Corp.), and after 15 s from the contact, a contact angle of an ink droplet on the recording medium was measured at 25° C.

DETAILED DESCRIPTION OF THE INVENTION

Figure 1:
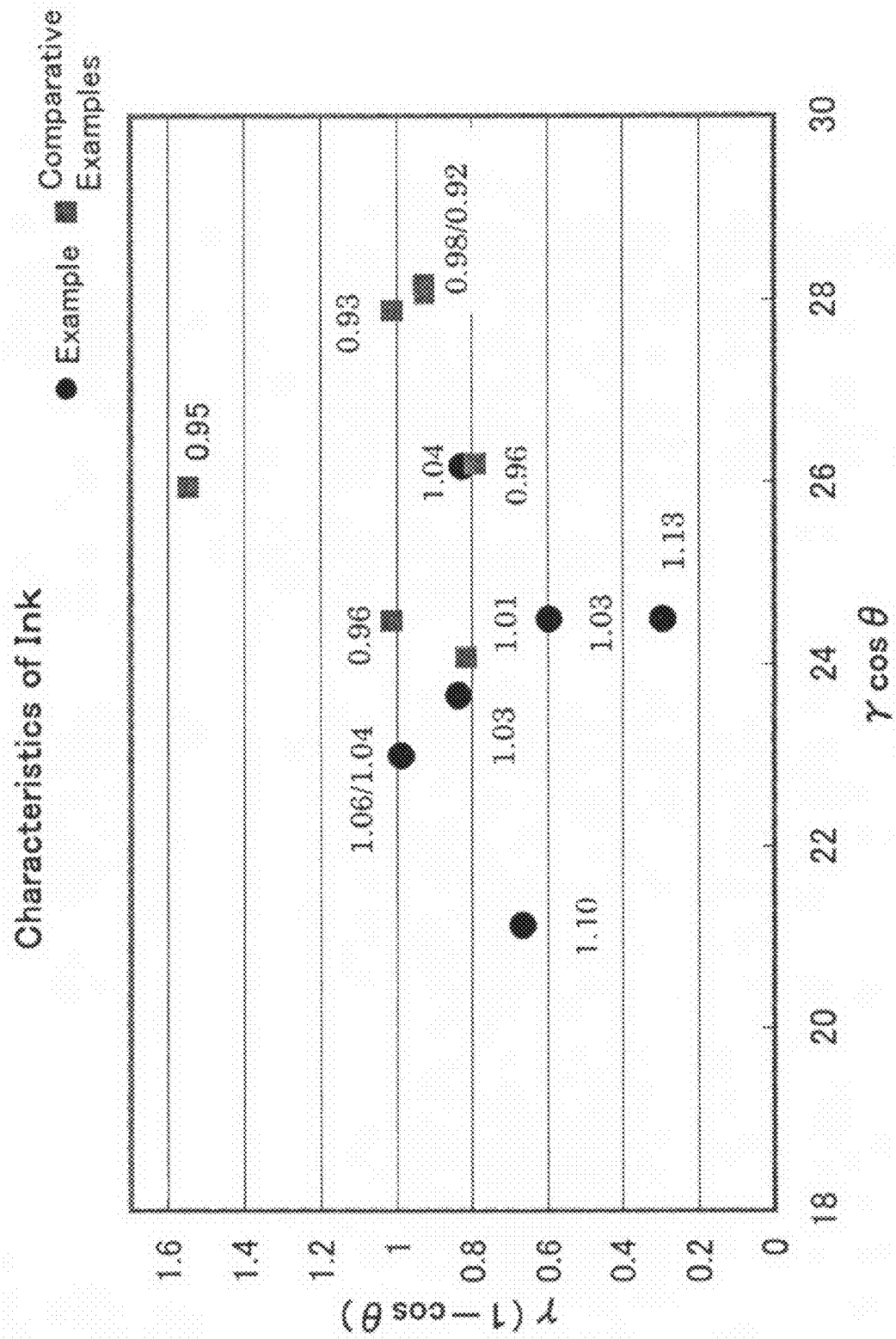
FIG. 1 is a plotting view of $\gamma \cos\theta$ and $\gamma(1-\cos\theta)$ of the water-based inks obtained in Examples 1 to 7 and Comparative Examples 1 to 7 in which numerical values represent optical densities of the respective inks.

The inventors have found that in order to achieve a high optical density even upon conducting high-speed printing by an ink-jet printing method, it is effective to (1) allow a colorant contained in a water-based ink to remain on a surface of a printing paper, and (2) reduce an amount of light reflected from the resultant printed images. Further, it has been found that (1) in order to allow the colorant to remain on a surface of a printing paper, it is effective to promote a wetting spreadability of the water-based ink on the surface of the printing paper and thereby prevent the water-based ink from penetrating to an inside of the paper, and (2) in order to reduce an amount of light reflected from the printed images, it is effective to include particles having a specific refractive index in the water-based ink.

In the first preferred embodiment of the present invention, there are provided a water dispersion for ink-jet printing, including a colorant, particles (A) (except for pigments) having a refractive index of 1.0 to 2.2, and a nonionic organic compound containing a saturated or unsaturated hydrocarbon group having 8 to 30 carbon atoms, and exhibiting a solubility of 1 g or less in 100 g of water as measured at 25° C.; and a water-based ink containing the water dispersion.

According to the above findings by the inventors, in order to allow the colorant contained in the water-based ink to remain on a surface of a printing paper, it is effective to promote a wetting spreadability of the water-based ink on the surface of the printing paper and thereby prevent the water-based ink from penetrating to an inside of the paper.

In the second preferred embodiment of the present invention based on the above findings, there is provided a water-based ink for ink-jet printing, including a colorant, particles (A) (except for pigments) having a refractive index of 1.0 to 2.2 and a nonionic organic compound, wherein a surface tension ($\gamma$) and a contact angle ($\theta$) of the water-based ink as measured by the following methods, satisfy the following formulae (1) and (2):

$$15 \leq \gamma \cos \theta \leq 27 \quad (1)$$

$$0.1 \leq \gamma(1-\cos \theta) \leq 1.3 \quad (2).$$

The water-based ink satisfying the above formulae (1) and (2) can exhibit a high optical density.

The surface tension ($\gamma$) and the contact angle ($\theta$) of the water-based ink may be measured by the following methods.

Method of Measuring the Surface Tension ($\gamma$):

Using a surface tension meter "CBVP-2" (tradename) available from Kyowa Interface Science Co., Ltd., a platinum plate was immersed in 5 g of the water-based ink filled in a cylindrical polyethylene container (3.6 cm in diameter×1.2 cm in depth) to measure a surface tension of the water-based ink at 25° C.

Method of Measuring the Contact Angle ($\theta$):

Using a static contact angle meter "CA-A" (tradename) (using a capillary having an inner diameter of 0.4 mm) available from Kyowa Interface Science Co., Ltd., about 2.4 µL of the water-based ink was contacted with a recording medium (plain paper "4024" (tradename) available from Xerox Corp.), and after 15 s from the contact, a contact angle of an ink droplet on the recording medium was measured at 25° C.

As a fundamental formula of liquid penetration, there is generally known the following Lucas-Washburn formula:

$$I = (r\gamma \cos \theta t/2\eta)^{1/2}$$

wherein I is a penetration velocity; r is a radius of a capillary; t is a time; $\eta$ is a viscosity; $\gamma$ is a surface tension; and $\theta$ is a contact angle.

The value "$\gamma \cos \theta$" is a factor governing the penetration velocity (penetration depth) of liquid in the Lucas-Washburn formula. The smaller the value "$\gamma \cos \theta$", the lower the penetration velocity becomes. More specifically, as the value "$\gamma \cos \theta$" becomes smaller, penetration of an ink into a paper is more shallow and an optical density of the printed images is enhanced. Therefore, in view of lowering the penetration velocity, the value "$\gamma \cos \theta$" is preferably 27 or less, more preferably 26.5 or less and still more preferably 25 or less, and in view of decreasing the value of the formula (2), the lower limit of the value "$\gamma \cos \theta$" is preferably 15 or more, more preferably 18 or more, still more preferably 20 or more, further still more preferably 20.5 or more and further still more preferably 21 or more. From these viewpoints, the value "$\gamma \cos \theta$" is preferably in the range of from 15 to 27, more preferably from 18 to 27, still more preferably from 20 to 27, further still more preferably from 20.5 to 26.5, further still more preferably from 21 to 26.5 and most preferably from 21 to 25.

It is also known that an amount of spread-wetting work of liquid is represented by the following Young formula;

$$W_{SP} = \gamma(1-\cos \theta)$$

wherein $W_{SP}$ is an amount of work; $\gamma$ is a surface tension; and $\theta$ is a contact angle.

The value "$\gamma(1-\cos \theta)$" corresponds to an amount of wetting work ($W_{SP}$) when a surface of a paper is wetted with the water-based ink. The smaller the value "$\gamma(1-\cos \theta)$", the more suitably the ink wets a surface of the paper. More specifically, as the $W_{SP}$ value becomes smaller, the ink spreads over a broader surface of the paper, resulting in enhancement in optical density. Therefore, in view of facilitated wetting and spreading of the ink, the value "$\gamma(1-\cos \theta)$" is preferably 1.3 or less, more preferably 1.2 or less, still more preferably 1.1 or less and further still more preferably 1.05 or less. In view of decreasing the value of the formula (1), the lower limit of the value "$\gamma(1-\cos \theta)$" is preferably 0.1 or more, more preferably 0.2 or more and still more preferably 0.25 or more. From these viewpoints, the $W_{SP}$ value is preferably in the range of from 0.1 to 1.3, more preferably from 0.1 to 1.2, still more preferably from 0.2 to 1.05, further still more preferably from 0.2 to 1.1 and further still more preferably from 0.25 to 1.05.

The surface tension $\gamma$ is preferably lower in view of a high optical density as recognized from the formulae (1) and (2). Specifically, the surface tension $\gamma$ is preferably 28 mN/m or less, more preferably 27.5 mN/m or less and still more preferably 27 mN/m or less as measured at 25° C. in view of a high optical density. The lower limit of the surface tension $\gamma$ is preferably 20 mN/m or more. Namely, the surface tension $\gamma$ is preferably in the range of from 20 to 28.0 mN/m, more preferably from 20 to 27.5 and still more preferably from 20 to 27.0 mN/m. In order to achieve the surface tension $\gamma$ within the above-specified range, a compound capable of reducing the surface tension may be added to the water-based ink.

The contact angle $\theta$ may be determined by a well balanced relation between the formulae (1) and (2). In view of a high optical density, the contact angle $\theta$ is preferably from 5° to 20°, more preferably from 6° to 19° and still more preferably from 7° to 18°. In order to satisfy the surface tension $\gamma$ and the contact angle $\theta$ in the above-specified ranges, a compound capable of not only reducing the surface tension but also exhibiting a low solubility in the water-based ink may be added to the water-based ink.

In the water-based ink for ink-jet printing according to the second preferred embodiment of the present invention, the nonionic organic compound (except for pigments) is not particularly limited as long as the resultant ink satisfies the above formulae (1) and (2), and is preferably the same nonionic organic compound as used in the first preferred embodiment of the present invention. Suitable examples and amount of the nonionic organic compound are also the same as those for the water-based ink for ink-jet printing according to the first preferred embodiment of the present invention.

Among them, the nonionic organic compounds capable of reducing the surface tension and exhibiting a low solubility in the ink are preferably used because the resultant ink can satisfy the above formulae (1) and (2).

Next, the compounds which are commonly used for the water dispersion and the water-based ink according to the first preferred embodiment of the present invention and the water-based ink according to the second preferred embodiment of the present invention, are described in detail.

[Nonionic Organic Compound]

In view of enhancing an optical density, the nonionic organic compound used in the present invention contains a saturated or unsaturated hydrocarbon group having 8 to 30 carbon atoms and exhibits a solubility of 1 g or less in 100 g of water as measured at 25° C. (hereinafter referred to merely as a "nonionic organic compound"). This is because such a nonionic organic compound has the effect of promoting a wetting spreadability of the water-based ink on a surface of a printing paper and thereby preventing the ink from penetrating to an inside of the paper.

The nonionic organic compound used in the present invention may contain, in addition to the saturated or unsaturated linear or branched hydrocarbon group having 8 to 30 carbon atoms, at least one substituent group selected from the group consisting of a hydroxyl group, an ester group, an ether group, a carbonyl group and an amide group. However, the saturated or unsaturated hydrocarbon group having 8 to 30 carbon atoms is not divided or separated by the substituent group such as an ester group, an ether group, a carbonyl group and an amide group. Also, when the substituent group is bonded to the hydrocarbon group, the carbon atoms of the ester group, carbonyl group and amide group may constitute a part of the carbon atoms of the hydrocarbon group having 8 to 30 carbon atoms. On the other hand, the nonionic organic compound contains no salt-forming group such as a carboxyl group, a sulfonic group, a phosphoric group, an amino group and an ammonium group in order to prevent the resultant dispersion or ink from being foamed.

The nonionic organic compound is preferably a compound having 2 or more hydroxyl groups (polyol compound), more preferably 2 to 6 hydroxyl groups, still more preferably 2 or 3 hydroxyl groups and further still more preferably 2 hydroxyl groups.

The nonionic organic compound contains a saturated or unsaturated hydrocarbon group having 8 to 30 carbon atoms, and the saturated or unsaturated hydrocarbon group preferably has 8 to 22 carbon atoms, more preferably 10 to 22 carbon atoms, still more preferably 10 to 18 carbon atoms and most preferably 12 to 18 carbon atoms. The hydrocarbon group may be either saturated or unsaturated, and may also be linear or branched.

More specifically, the nonionic organic compound is preferably at least one compound selected from the group consisting of the following compounds (1) to (3):

(1) A linear or branched alkane, alkene or alkyne polyol having 8 to 30 carbon atoms. Examples of the polyol (1) include linear or branched alkane, alkene or alkyne diol or triol having 8 to 30 carbon atoms whose hydroxyl groups may be bonded to any positions thereof (2) An ester or ether compound containing a linear or branched alkyl or alkenyl group having 8 to 30 carbon atoms. Examples of the ester or ether compound (2) include ester compounds of a linear or branched carboxylic acid having 8 to 30 carbon atoms and a monohydric or polyhydric alcohol, and ether compounds of a linear or branched alcohol having 8 to 30 carbon atoms and a monohydric or polyhydric alcohol.

(3) An ester or ether compound containing a linear or branched alkylene or alkenylene group having 8 to 30 carbon atoms. Examples of the ester or ether compound (3) include diester compounds of a linear or branched $\alpha,\omega$-dicarboxylic acid having 8 to 30 carbon atoms and a monohydric or polyhydric alcohol, and ether or diether compounds of a linear or branched $\alpha,\omega$-diol having 8 to 30 carbon atoms and a monohydric or polyhydric alcohol.

Examples of the monohydric alcohol used in the compound (2) or (3) include those alcohols having 1 to 6 carbon atoms such as ethanol, isopropyl alcohol, butanol and pentanol. Examples of the polyhydric alcohol used in the compound (2) or (3) include glycerols such as mono- or polyglycerol; glycols such as ethylene glycol; and sugars such as glucose and sorbitol. Among these compounds, preferred are polyhydric alcohols.

In view of achieving a high optical density of the resultant dispersion or ink, the nonionic organic compound preferably has a molecular weight of 100 or more and more preferably 200 or more. The upper limit of the molecular weight of the nonionic organic compound is preferably 3000 or less, more preferably 2000 or less, still more preferably 1000 or less and most preferably 500 or less. From the above viewpoints, the molecular weight of the nonionic organic compound is preferably in the range of from 100 to 3,000, more preferably from 100 to 2,000, still more preferably from 100 to 1,000, further still more preferably from 200 to 1000 and most preferably from 200 to 500.

The surface tension of water containing 0.001% by weight of the nonionic organic compound (solution prepared by adding 0.001 g of the nonionic organic compound in 100 g of water) as measured at 25° C. is preferably 67 mN/m or less, more preferably 60 mN/m or less, still more preferably 53 mN/m or less and most preferably 50 mN/m or less in view of a high optical density. The lower limit of the surface tension is preferably 40 mN/m or more.

Meanwhile, when the solubility of the nonionic organic compound in water is less than 0.001% by weight, the surface tension thereof may be measured using water containing the nonionic organic compound at a maximum solubility.

The solubility of the nonionic organic compound in 100 g of water as measured at 25° C. is 1 g or less, preferably 0.50 g or less, more preferably 0.30 g or less and most preferably 0.10 g or less in view of a high optical density. The lower limit of solubility of the nonionic organic compound in 100 g of water is preferably 0.0001 g or more.

The nonionic organic compound used in the present invention may be added with an ethyleneoxide group and/or a propyleneoxide group unless the addition of these groups to the nonionic organic compound adversely affects the effects of the present invention.

More specifically, the nonionic organic compound is preferably at least one compound selected from the group consisting of (1) an alkane, alkene or alkyne diol having 8 to 30 carbon atoms, (2) a fatty acid monoglyceride having 8 to 30 carbon atoms, and (3) a monoalkyl glyceryl ether having 8 to 30 carbon atoms.

(1) Alkane, Alkene or Alkyne Diol Compound having 8 to 30 Carbon Atoms:

The alkane, alkene or alkyne diol compound having 8 to 30 carbon atoms preferably contains hydroxyl groups respectively bonded to adjacent carbon atoms thereof. In view of a high optical density, the total number of carbon atoms contained in the alkane, alkene or alkyne diol compound is preferably from 8 to 22, more preferably from 10 to 22, still more preferably from 10 to 18 and most preferably from 12 to 18.

Specific examples of the alkane, alkene or alkyne diol having 8 to 30 carbon atoms include 1,2-octanediol, 1,2-decanediol, 1,2-dodecanediol, 1,2-tetradecanediol, 1,2-hexadecanediol, 1,2-octadecanediol, 1,2-eicosanediol, 1,2-docosanediol, 2,4,7,9-tetramethyl-5-decyne-4,7-diol and 3,6-dimetyl-4-octyne-3,6-diol. These diol compounds may be either linear or branched.

Among these compounds, preferred diols (and surface tension thereof) are, for example, 1,2-octanediol (65 mN/m), 1,2-decanediol (55 mN/m) and 1,2-dodecanediol (47.1 mN/m).

Also, as to the solubility of these compounds in 100 g of water as measured at 25° C., for example, the solubility values of 1,2-octanediol, 1,2-decanediol and 1,2-dodecanediol are 0.20 g, 0.055 g and 0.001 g, respectively.

(2) Fatty Acid Monoglyceride having 8 to 30 Carbon Atoms:

In the fatty acid monoglyceride having 8 to 30 carbon atoms, the number of carbon atoms in a fatty acid moiety thereof is preferably from 8 to 22, more preferably from 10 to 22, still more preferably from 12 to 22 and most preferably from 12 to 18 in view of a high optical density and a good anti-foaming property. The fatty acid may be either linear or branched, and is preferably linear. Also, the fatty acid may be either saturated or unsaturated. In addition, the fatty acid monoglyceride may be in the form of either 1-fatty acid monoglyceride or 2-fatty acid monoglyceride. In the present invention, the fatty acid monoglyceride used herein means a 1-fatty acid monoglyceride unless otherwise specified. Specific examples of the fatty acid monoglyceride include monoesters of at least one fatty acid selected from the group consisting of octanoic acid, 2-ethylhexanoic acid, decanoic acid, isodecanoic acid, lauric acid, myristic acid, palmitic acid, oleic acid, stearic acid, isostearic acid and behenic acid with a glycerol.

Among these compounds, preferred fatty acid monoglycerides (and surface tension thereof) are, for example, decanoic acid monoglyceride (65 mN/m) and lauric acid monoglyceride (63 mN/m).

Also, as to the solubility of these compounds in 100 g of water as measured at 25° C., for example, the solubility values of decanoic acid monoglyceride and lauric acid monoglyceride are 0.01 g and 0.005 g, respectively.

(3) Monoalkyl Glyceryl Ether having 8 to 30 Carbon Atoms:

In the monoalkyl glyceryl ether having 8 to 30 carbon atoms, the number of carbon atoms in an alkyl group contained therein is preferably from 8 to 22, more preferably from 10 to 22, still more preferably from 12 to 22 and most preferably from 12 to 18. The alkyl group may be either linear or branched, and is preferably linear. The bonding position of the alkyl group to the monoalkyl glyceryl ether may be either the 1-position (1-alkyl glyceryl ether) or the 2-position (2-alkyl glyceryl ether). In the present invention, the alkyl glyceryl ether used herein means the 1-alkyl glyceryl ether unless otherwise specified. Specific examples of the monoalkyl glyceryl ether include at least one compound selected from the group consisting of octyl glyceryl ether, 2-ethylhexyl glyceryl ether, decyl glyceryl ether, isodecyl glyceryl ether, dodecyl glyceryl ether, myristyl glyceryl ether, stearyl glyceryl ether, isostearyl glyceryl ether and behenyl glyceryl ether.

Among these compounds, preferred monoalkyl glyceryl ethers (and surface tension thereof) are, for example, 2-ethylhexyl glyceryl ether (62 mN/m) and isodecyl glyceryl ether (57.8 mN/m).

Also, as to the solubility of these compounds in 100 g of water as measured at 25° C., for example, the solubility values of 2-ethylhexyl glyceryl ether and isodecyl glyceryl ether are 0.15 g and 0.05 g, respectively.

[Particles (A) (Except for Pigments) having a Refractive Index of 1.0 to 2.2]

In the present invention, in view of reducing an amount of light reflected from printed images to enhance an optical density thereof, and in view of preventing penetration of the colorant into papers to enhance an optical density thereof, there are used particles (A) having a refractive index of 1.0 to 2.2 (hereinafter referred to merely as "particles (A)").

The refractive index of the particles (A) used in the present invention is 1.0 or more, preferably 1.1 or more, more preferably 1.2 or more and still more preferably 1.3 or more in view of a good optical density. The upper limit of the refractive index of the particles (A) is 2.2 or less, preferably 1.8 or less, more preferably 1.7 or less, still more preferably 1.65 or less and most preferably 1.6 or less. From these viewpoints, the refractive index of the particles (A) is preferably in the range of from 1.0 to 1.8, more preferably from 1.1 to 1.7, still more preferably from 1.2 to 1.65 and further still more preferably from 1.3 to 1.6. The particles having a refractive index in the above specific range are capable of effectively reducing an amount of light reflected. The refractive index may be measured by using the below-mentioned light interference type film thickness measuring apparatus "LAMBDA-ACE VM-1000" (product name) available from Dai-Nippon Screen Mfg.Co., Ltd. When the particles (A) are in the form of a powder, the refractive index of the particles (A) may be determined by measuring a refractive index of a dispersion prepared by dispersing 1 part by weight of the particles (A) in a dispersing medium such as water and ethanol using about 0.01 part by weight of a polyacrylic acid salt (for example, "POISE 530A" available from Kao Corp.) by the above method.

The average particle size of the particles (A) used in the present invention is preferably 30 nm or more, more preferably 50 nm or more and still more preferably 70 nm in view of enhanced optical density due to reduction in amount of light reflected as well as a good dispersion stability and a good ejection property. The upper limit of the average particle size of the particles (A) is preferably 500 nm or less, more preferably 300 nm or less, still more preferably 250 nm or less and further still more preferably 200 nm or less. From these viewpoints, the average particle size of the particles (A) is preferably in the range of from 30 to 500 nm, more preferably from 30 to 300 nm, still more preferably from 50 to 250 nm and further still more preferably from 70 to 200 nm. When the average particle size of the particles (A) lies within the above-specified range, an amount of light reflected can be effectively reduced. The average particle size of the particles (A) may be measured using a laser particle analyzing system "ELS-8000" (cumulant analysis) available from Otsuka Electronics Co., Ltd. The measurement is conducted at a temperature of 25° C., an angle between incident light and detector of 90° and a cumulative frequency of 100 times, and a refractive index of water (1.333) is input to the analyzing system as a refractive index of the dispersing medium. The concentration of the solution to be measured is usually about $5 \times 10^{-3}$% by weight.

The above definitions concerning the refractive index and average particle size of the particles (A) are based on the present inventors' finding that a high optical density of printed images can be achieved by reducing a light reflectance from a surface of the printed images even upon high-speed printing.

In general, in order to reduce a light reflectance from a surface of printed images, it is effective to reduce an amount of light scattered on a surface of the colorant to thereby enhance an amount of light absorbed into the colorant, i.e., enhance an absorptivity of the colorant.

When the water-based ink containing the particles (A) together with the colorant, in particular, pigments is applied onto a printing paper by an ink-jet printing method, it is considered that an agglomerate of the particles (A) covers the colorant forming the printed images in microfine portions of the ink applied and, therefore, has the same function as that of an anti-reflection film for the printed images, resulting in improved optical density of the printed images.

In general, when a colorant is present together with a substance having a different refractive index from that of the colorant, a reflectivity R of a printed surface is represented by the following formula:

Reflectivity $R = [(n_0 n_2 - n_1 n_1)/(n_0 n_2 + n_1 n_1)]^2$ wherein $n_0$ is a refractive index of air; $n_2$ is a refractive index of the colorant; and $n_1$ is a refractive index of the substance present on the colorant.

In the above formula, when it is assumed that the refractive index of air is 1.00, in order to enhance an optical density, the reflectivity R may be minimized. In order to minimize the value of the above formula, it is preferable that $n_1$ is equal to $\sqrt{2}(n_1=\sqrt{n_2})$.

The refractive index of quinacridone-based pigments is about 2, whereas the refractive index of phthalocyanine-based pigments is about 1.4. In view of the refractive index values of these pigments, it is recognized that the refractive index of the particles (A) used in the present invention suitably lies within the above-specified range.

Also, it is known that in order to minimize an intensity of light reflected, a phase of light reflected on a surface of the colorant may be reversed to a phase of light reflected on a surface of the substance present on the colorant. Therefore, a thickness d of the substance present on the colorant preferably satisfies the following formula:

$$\text{Thickness } d=\lambda/[(2+2\sqrt{2})\times n_1]$$

wherein $\lambda$ is a wavelength of light.

Meanwhile, the thickness d is the value calculated on the assumption of a light incident angle of 45° and a light receiving angle of 0° (as the measuring conditions for a Macbeth densitometer).

When taking into account a measuring wavelength ($\lambda$) for magenta of 536 nm (half-value width: ±20 nm), a measuring wavelength ($\lambda$) for cyan of 624 nm (half-value width: ±20 nm) and a measuring wavelength ($\lambda$) for yellow of 432 nm (half-value width: ±20 nm), it is recognized that the average particle size of the particles (A) used in the present invention suitably lies within the above-specified range.

In addition, it is also recognized that after the water-based ink is ejected from nozzles of an ink-jet printer, the particles (A) have an effect of preventing the colorant contained in the same water-based ink from being sunk into a plain paper, which will contribute to enhancement in optical density.

The particles (A) may be either organic particles or inorganic particles. Among these particles, preferred are inorganic particles and/or polymer particles, and more preferred are at least one kind of particles selected from the group consisting of inorganic particles, polystyrene particles and fluorine-containing polymer particles.

Examples of the polymer particles include particles of polymers such as polystyrene, styrene-(meth)acrylic acid copolymers, polymethyl methacrylate, (meth)acrylic acid alkyl ester copolymers, styrene-butadiene copolymers, polybutadiene, acrylonitrile-butadiene copolymers, silicon-(meth)acrylic ester copolymers, fluorine-(meth)acrylic ester copolymers, polytetrafluoroethylene and silicone polymers. Among these polymer particles, preferred are polystyrene particles. Also, fluorine-containing polymer particles such as particles of fluorine-(meth)acrylic ester copolymers and polytetrafluoroethylene are preferred in view of a low refractive index. The glass transition temperature (Tg) of the polymer particles is preferably 20° C. or higher and more preferably 30° C. or higher in view of allowing the polymer particles to be present in the form of particles on the colorant. The upper limit of Tg of the polymer particles is not particularly limited, and is preferably 250° C. or lower. From these viewpoints, Tg of the polymer particles is preferably in the range of from 20 to 250° C. and more preferably from 30 to 250° C. Tg of the polymer particles may be measured by the method as described in Examples below. When Tg of the polymer particles is 20° C. or higher, the polymer fine particles are prevented from being formed into a film even when heat is applied thereto in the ink drying step after printing, and allowed to be present in the form of particles on the colorant.

The weight-average molecular weight of the polymer forming the polymer particles is preferably from 5,000 to 500,000, more preferably from 10,000 to 400,000 and still more preferably from 10,000 to 300,000 in view of a good gloss of printed images formed on a recording medium. Meanwhile, the weight-average molecular weight of the polymer may be measured by gel permeation chromatography using dimethylformamide containing 60 mmol/L of phosphoric acid and 50 mmol/L of lithium bromide as a solvent and using polystyrene as a standard substance.

The constitutional units of the polymer forming the polymer particles may be the same as or different from those of a polymer forming the below-mentioned water-insoluble polymer particles (B) containing the colorant. However, it should be noted that the polymer particles (A) contains no colorant.

Examples of the inorganic particles include particles of inorganic substances such as silicon oxide (hereinafter referred to merely as "silica"), aluminum oxide (hereinafter referred to merely as "alumina"), magnesium fluoride, manganese oxide, magnesium oxide, calcium carbonate, magnesium carbonate, barium sulfate, aluminum silicate, alumina white, talc, clay and mica titanium, as well as those particles obtained by modifying or surface-modifying these inorganic particles with a functional group such as a carboxyl group and an amino group, and composite particles of these inorganic particles with a surfactant. Among these inorganic particles, in view of a good dispersibility, preferred are metal oxide particles, more preferred are colloidal particles, still more preferred are at least one kind of particles selected from the group consisting of colloidal silica and colloidal alumina, and most preferred is colloidal silica produced from a silicic acid aqueous solution.

Colorant

The colorant used in the present invention may be either hydrophobic dye or pigment. Also, the hydrophobic dye and pigment may be combined with each other at an optional ratio. Among these colorants, to meet the recent strong demand for a high weather resistance, preferred is the pigment.

The pigment used herein means organic pigments and/or carbon blacks.

Examples of the organic pigments include azo pigments, disazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include C.I. Pigment Yellow 13, 17, 74, 83, 97, 109, 110, 120, 128, 139, 151, 154, 155, 174, 180; C.I. Pigment Red 48, 57:1, 122, 146, 176, 184, 185, 188, 202; C.I. Pigment Violet 19, 23; C.I. Pigment Blue 15, 15:1, 15:2, 15:3, 15:4, 16, 60; and C.I. Pigment Green 7, 36.

The carbon blacks may include furnace blacks, thermal lamp blacks, acetylene blacks and channel blacks.

The pigment may be in the form of a self-dispersible pigment. The "self-dispersible pigment" means a pigment onto a surface of which at least one salt-forming group such as an anionic or cationic hydrophilic group is bonded either directly or through the other atom group to thereby allow the pigment to be dispersed in an aqueous medium without using a surfactant or a resin.

The hydrophobic dyes are preferably used as dyes since they are capable of being included in the water-insoluble polymer. Examples of the hydrophobic dyes include oil dyes and disperse dyes. To allow the dye to efficiently become included in the water-insoluble polymer, the solubility of the hydrophobic dye in an organic solvent is preferably 2 g/L or more and more preferably from 20 to 500 g/L as measured at 25° C. on the basis of the organic solvent used for dissolving the hydrophobic dye upon production of the water dispersion.

Examples of the oil dyes include C.I. Solvent Black 3, 7, 27, 29, 34, 45; C.I. Solvent Yellow 14, 16, 29, 56, 82, 83:1; C.I. Solvent Red 1, 3, 8, 18, 24, 27, 43, 49, 51, 72, 73; C.I. Solvent Violet 3; C.I. Solvent Blue 2, 4, 11, 44, 64, 70; C.I. Solvent Green 3, 7; and C.I. Solvent Orange 2.

Examples of commercially available oil dyes include "Nubian Black PC-0850", "Oil Black HBB", "Oil Black 860", "Oil Yellow 129", "Oil Yellow 105", "Oil Pink 312", "Oil Red 5B", "Oil Scarlet 308", "Vali Fast Blue 2606" and "Oil Blue BOS" (tradenames) all available from Orient Chemical Industries, Ltd.; and "Neopen Yellow 075", "Neopen Mazenta SE1378", "Neopen Blue 808", "Neopen Blue 807", "Neopen Blue FF4012" and "Neopen Cyan FF4238" (tradenames) all available from BASF AG.

Examples of the disperse dyes include C.I. Disperse Yellow 5, 42, 54, 64, 79, 82, 83, 93, 99, 100, 119, 122, 124, 126, 160, 184:1, 186, 198, 199, 204, 224, 237; C.I. Disperse Orange 13, 29, 31:1, 33, 49, 54, 55, 66, 73, 118, 119, 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, 368; and C.I. Disperse Green 6:1, 9. Among these dyes, preferred are C.I. Solvent Yellow 29 and 30 for yellow colorant, C.I. Solvent Blue 70 for cyan colorant, C.I. Solvent Red 18 and 49 for magenta colorant, and C.I. Solvent Black 3 and 7 and nigrosine black dyes for black colorant.

To enhance a dispersion stability, an optical density, etc., the content of the colorant in the water dispersion of the present invention or the water-based ink according to each of the first and second preferred embodiments of the present invention is preferably from 1 to 20% by weight and more preferably from 3 to 10% by weight.

In the present invention, when using the water-insoluble polymer particles containing the colorant, to enhance the optical density, the amounts of the water-insoluble polymer and the colorant are adjusted such that the weight ratio of the colorant to the water-insoluble polymer [colorant/water-insoluble polymer] is preferably from 50/50 to 90/10, more preferably from 50/50 to 80/20 and still more preferably from 55/45 to 78/22.

Water-Insoluble Polymer

The water dispersion and the water-based ink according to the present invention are preferably obtained by using a water dispersion containing water-insoluble polymer particles in which the colorant is included or incorporated, in view of attaining excellent rubbing resistance, low viscosity and excellent ejecting property.

Examples of the water-insoluble polymer forming the water-insoluble polymer particles include water-insoluble vinyl polymers, water-insoluble ester-based polymers and water-insoluble urethane-based polymers. Among these water-insoluble polymers, preferred are water-insoluble vinyl polymers in view of a good stability of the resultant water dispersion. The term "water-insoluble polymer" used herein means such a polymer which is dissolved at 25° C. in 100 g of water in an amount of 10 g or less, preferably 5 g or less and more preferably 1 g or less after dried at 105° C. for 2 h. When the water-insoluble polymer contains a salt-forming group, the above amount of the water-insoluble polymer dissolved in water is measured after the salt-forming group is neutralized 100% with acetic acid or sodium hydroxide according to the kind of salt-forming group to be neutralized.

In view of good gloss of the resultant printed images, the water-insoluble polymer used in the present invention preferably contains a constitutional unit represented by the following general formula (1):

(1)

In the general formula (1), $R^1$ is a hydrogen atom or a methyl group, and $R^2$ is a substituted or unsubstituted arylalkyl group having 7 to 22 carbon atoms, preferably 7 to 18 carbon atoms and more preferably 7 to 12 carbon atoms, or a substituted or unsubstituted aryl group having 6 to 22 carbon atoms, preferably 6 to 18 carbon atoms and more preferably 6 to 12 carbon atoms. The substituent group which may be bonded to $R^2$ may contain a hetero atom. Examples of the hetero atom include a nitrogen atom, an oxygen atom and a sulfur atom.

Specific examples of $R^2$ include a benzyl group, a phenethyl (phenylethyl) group, a phenoxyethyl group, a diphenylmethyl group and a trityl group.

Specific examples of the substituent group which may be bonded to $R^2$ include an alkyl, alkoxy or acyloxy group having preferably 1 to 9 carbon atoms, a hydroxyl group, an ether group, an ester group and a nitro group.

The constitutional unit represented by the general formula (1) is especially preferably those constitutional units derived from benzyl (meth)acrylate in view of a high gloss of the resultant printed images.

The constitutional unit represented by the general formula (1) is preferably produced by polymerizing a monomer represented by the following general formula (1-1):

$$CH_2=CR^1COOR^2 \qquad (1\text{-}1)$$

wherein $R^1$ and $R^2$ are the same as defined above.

More specifically, a polymer containing the constitutional unit represented by the general formula (1) may be produced by polymerizing a monomer such as phenyl (meth)acrylate, benzyl (meth)acrylate, 2-phenylethyl (meth)acrylate, phenoxyethyl (meth)acrylate, 1-naphthyl acrylate, 2-naphthyl (meth)acrylate, phthalimidemethyl (meth)acrylate, p-nitrophenyl (meth)acrylate, 2-hydroxy-3-phenoxypropyl (meth) acrylate, 2-methacryloyloxyethyl-2-hydroxypropyl phthalate and 2-acryloyloxyethyl phthalic acid. Among these monomers, especially preferred is benzyl (meth)acrylate. These monomers may be used alone or in the form of a mixture of any two or more thereof.

Meanwhile, the term "(meth)acrylate" used herein means an "acrylate", a "methacrylate" or a mixture thereof.

The water-insoluble vinyl polymer used in the present invention further contains the constitutional unit represented by the following general formula (2):

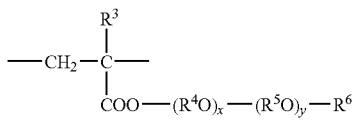

(2)

In the above general formula (2), $R^3$ represents a hydrogen atom or a methyl group, and $R^4O$ is an oxypropylene group. $R^4O$ may include —$CH(CH_3)CH_2O$— in addition to —$CH_2CH(CH_3)O$—. $R^5O$ represents an oxyalkylene group having 2 or 4 carbon atoms and is preferably an oxyethylene group or an oxytetramethylene group.

$R^6$ represents a hydrogen atom, an alkyl group having 1 to 20 carbon atoms or a phenyl group which may be substituted with an alkyl group having 1 to 9 carbon atoms.

From the standpoints of a high optical density and a good storage stability of the resultant ink, among these groups as $R^6$, preferred are alkyl groups having 1 to 12 carbon atoms, and more preferred are alkyl groups having 1 to 8 carbon atoms, and also preferred are phenyl groups which may be substituted with an alkyl group having 1 to 8. Examples of the alkyl group having 1 to 8 carbon atoms include methyl, ethyl, propyl, isopropyl, butyl, t-butyl, hexyl, octyl and 2-ethylhexyl.

$R^4O$ and $R^5O$ may be either random-added or block-added. When $R^4O$ and $R^5O$ are block-added, the block-added structure may be in the form of either —COO—$(R^4O)_x$—$(R^5O)_y$—$R^6$ or —COO—$(R^5O)_y$—$(R^4O)_x$—$R^6$.

The suffixes x and y represent average molar numbers of addition where x is a number from 1 to 30, preferably from 2 to 30, more preferably from 3 to 20 and still more preferably from 3 to 15, and y is a number from 0 to 30, preferably from 0 to 20 and more preferably from 0 to 15. If y is 2 or more, a plurality of the $R^5O$ groups may be the same or different.

The constitutional unit represented by the general formula (2) is preferably produced by polymerizing a monomer represented by the following general formula (2-1):

$$CH_2=CR^3COO-(R^4O)_x-(R^5O)_y-R^6 \qquad (2\text{-}1)$$

wherein $R^3$, $R^4O$, $R^5O$, $R^6$, x and y are the same as defined above.

Among those constitutional units represented by above general formula (2), the constitutional units represented by the following general formula (3) or (4) are preferred in view of a high optical density of the resultant dispersion or ink. Further, the water-insoluble polymer used in the present invention may contain both constitutional units represented by the following general formulae (3) and (4).

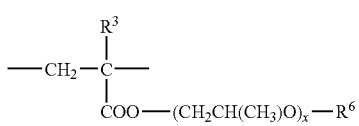

(3)

wherein $R^3$, x and $R^6$ are the same as defined above.

The constitutional unit represented by the general formula (3) corresponds to the constitutional unit represented by the general formula (2) in which y is 0.

The constitutional unit represented by the general formula (3) is preferably produced by polymerizing a monomer represented by the following general formula (3-1):

$$CH_2=CR^3COO-[CH_2CH(CH_3)O]_x-R^6 \qquad (3\text{-}1)$$

wherein $R^3$, $R^6$ and x are the same as defined above.

Specific examples of the monomer represented by the general formula (3-1) include polypropylene glycol mono(meth) acrylate, methoxy polypropylene glycol mono(meth)acrylate, ethoxy polypropylene glycol mono(meth)acrylate, octoxy polypropylene glycol mono(meth)acrylate, stearoxy polypropylene glycol mono(meth)acrylate, nonylphenoxy polypropylene glycol mono(meth)acrylate and phenoxy polypropylene glycol mono(meth)acrylate. Among these monomers, especially preferred is polypropylene glycol mono(meth)acrylate. These monomers may be used alone or in the form of a mixture of any two or more thereof.

The constitutional unit represented by the following general formula (4) corresponds to the constitutional unit represented by the general formula (2) in which y is 1 or more.

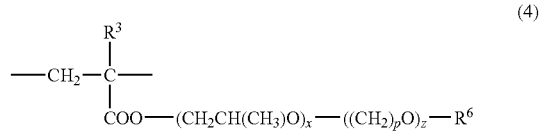

(4)

wherein $R^3$, $R^6$ and x are the same as defined above; p is a number of 2 or 4; z represents an average molar number of addition, and is a number from 1 to 30, preferably from 2 to 20 and more preferably from 3 to 15; and $[CH_2CH(CH_3)O]$ and $[(CH_2)_pO]$ are random-added or block-added, and when being block-added, the block-added structure may be in the form of either —COO—$[CH_2CH(CH_3)O]_x$—$[(CH_2)_pO]_z$—$R^6$ or —COO—$[(CH_2)_pO]_z$—$[CH_2CH(CH_3)O]_x$—$R^6$.

The constitutional unit represented by the general formula (4) is preferably produced by polymerizing a monomer represented by the following general formula (4-1) or (4-2):

$$CH_2=CR^3COO-[CH_2CH(CH_3)O]_x-(CH_2CH_2O)_z-R^6 \qquad (4\text{-}1); \text{ or}$$

$$CH_2=CR^3COO-[CH_2CH(CH_3)O]_x-[(CH_2)_4O]_z-R^6 \qquad (4\text{-}2),$$

wherein $R^3$, $R^6$, x and z are the same as defined above; $[CH_2CH(CH_3)O]$ and $(CH_2CH_2O)$ as well as $[CH_2CH(CH_3)O]$ and $[(CH_2)_4O]$ are random-added or block-added, and when being block-added, the block-added structures may be in the form of either $CH_2=CR^3COO-[CH_2CH(CH_3)O]_x-(CH_2CH_2O)_z-R^6$ or $CH_2=CR^3COO-(CH_2CH_2O)_z-[CH_2CH(CH_3)O]_x-R^6$, or either $CH_2=CR^3COO-[CH_2CH(CH_3)O]_x-[(CH_2)_4O]_z-R^6$ or $CH_2=CR^3COO-[(CH_2)_4O]_z-[CH_2CH(CH_3)O]_x-R^6$.

Specific examples of the monomers represented by the general formulae (4-1) and (4-2) include ethylene glycol/propylene glycol (meth)acrylate, poly(ethylene glycol/propylene glycol) mono(meth)acrylate [in which ethylene glycol and propylene glycol are randomly bonded], octoxy polyethylene glycol/polypropylene glycol mono(meth)acrylate [in which polyethylene glycol and polypropylene glycol are block-bonded, and the polyethylene glycol and polypropylene glycol may be successively block-bonded from the side of the (meth)acrylic group, or vice versa; this definition is similarly applied to the below-mentioned compounds], octoxy poly(ethylene glycol/propylene glycol) mono(meth)

acrylate, stearoxy polyethylene glycol/polypropylene glycol mono(meth)acrylate, stearoxy poly(ethylene glycol/propylene glycol) mono(meth)acrylate, phenoxy polyethylene glycol/polypropylene glycol mono(meth)acrylate, phenoxy poly(ethylene glycol/propylene glycol) mono(meth)acrylate, nonylphenoxy polyethylene glycol/polypropylene glycol mono(meth)acrylate, nonylphenoxy poly(ethylene glycol/propylene glycol) mono(meth)acrylate, and poly(propylene glycol/tetramethylene glycol) mono(meth)acrylate. Among these monomers, especially preferred are poly(ethylene glycol/propylene glycol) mono(meth)acrylate and poly(propylene glycol/tetramethylene glycol) mono(meth)acrylate. These monomers may be used alone or in the form of a mixture of any two or more thereof.

Specific examples of commercially available products of the monomer represented by the general formula (2-1) include BLEMMER Series PP-500, PP-800, PP-1000, 50AOEP-800B, 43ANEP-500, 70ANEP-550, 50PEP-300, 50PPT-800 and 50POEP-800B all available from NOF Corporation.

In the water-insoluble vinyl polymer used in the present invention, the weight ratio of the constitutional unit represented by the general formula (1) to the constitutional unit represented by the general formula (2) [constitutional unit represented by the general formula (1)/constitutional unit represented by the general formula (2)] in the polymer is preferably in the range of from 1/2 to 10/1, more preferably from 1/2 to 8/1, still more preferably from 1/2 to 5/1 and most preferably from 1/1 to 5/1 in view of achieving both a high optical density and a good gloss as well as a high fixing property.

The water-insoluble vinyl polymer used in the present invention preferably further contains a constitutional unit derived from a salt-forming group -containing monomer (a) in view of enhancing a dispersibility of the polymer. Examples of the salt-forming group include a carboxyl group, a sulfonic group, a phosphoric group, an amino group and an ammonium group. The constitutional unit derived from the salt-forming group-containing monomer (a) can be produced by polymerizing a salt-forming group -containing monomer. Alternatively, after completion of the polymerization, salt-forming groups such as anionic groups and cationic groups may be introduced into the resultant polymer chain.

Examples of the preferred salt-forming group-containing monomer (a) include an anionic monomer (a-1) and a cationic monomer (a-2).

Anionic Monomer (a-1):

As the anionic monomer (a-1), there may be used at least one compound selected from the group consisting of unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid.

Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconate.

Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, preferred are the unsaturated carboxylic acid monomers in view of a suitable viscosity and a good ejecting property of the resultant ink, and more preferred are acrylic acid and methacrylic acid.

Cationic Monomer (a-2):

As the cationic monomer (a-2), there may be used at least one compound selected from the group consisting of unsaturated tertiary amine-containing vinyl monomers and unsaturated ammonium salt-containing vinyl monomers.

Examples of the unsaturated tertiary amine-containing vinyl monomers include N,N-dimethylaminoethyl (meth)acrylate, N,N-dimethylaminopropyl (meth)acrylate, N,N-diethylaminoethyl (meth)acrylate, N,N-dimethylaminopropyl (meth)acrylamide, vinyl pyrrolidone, 2-vinyl pyridine, 4-vinyl pyridine, 2-methyl-6-vinyl pyridine and 5-ethyl-2-vinyl pyridine.

Examples of the unsaturated ammonium salt-containing vinyl monomers include quaternary ammonium compounds derived from N,N-dimethylaminoethyl (meth)acrylate, quaternary ammonium compounds derived from N,N-diethylaminoethyl (meth)acrylate, and quaternary ammonium compounds derived from N,N-dimethylaminopropyl (meth)acrylate.

Among the above cationic monomers, preferred are N,N-dimethylaminoethyl (meth)acrylate, N,N-dimethylaminopropyl (meth)acrylamide and vinyl pyrrolidone.

These salt-forming group-containing monomers (a) may be used alone or in the form of a mixture of any two or more thereof.

In order to allow the resultant dispersion or ink to exhibit sufficient optical density and dispersion stability, the water-insoluble polymer is preferably a water-insoluble graft polymer which includes a polymer containing the constitutional units represented by the above general formula (1) and/or the above general formula (2), and a constitutional unit derived from the salt-forming group-containing monomer (a) in a main chain thereof, and a constitutional unit derived from a macromer (b) in a side chain thereof Examples of the macromer as the component (b) include the below-mentioned styrene-based macromers (b-1), alkyl (meth)acrylate-based macromers (b-2), aromatic ring-containing (meth)acrylate-based macromers (b-3) and silicone-based macromers (b-4).

The component (b) is used to enhance an optical density and a dispersion stability of the colorant-containing water-insoluble polymer fine particles, etc., and may be such a macromer which is a monomer containing a polymerizable functional group such as an unsaturated group at one terminal end thereof and having a number-average molecular weight of 500 to 100,000 and preferably 1,000 to 10,000.

Meanwhile, the number-average molecular weight of the component (b) may be measured by gel permeation chromatography using polystyrene as a standard substance and using tetrahydrofuran containing 50 mmol/L of acetic acid as a solvent.

Styrene-Based Macromer (b-1):

The styrene-based macromer means a macromer containing a constitutional unit derived from the styrene-based monomer (hereinafter referred to merely as a "monomer (b-1)") such as styrene, α-methyl styrene and vinyl toluene. Among these styrene-based monomers, preferred is styrene.

Examples of the styrene-based macromer include styrene homopolymers having a polymerizable functional group at one terminal end thereof, and copolymers of styrene with the other monomer which have a polymerizable functional group at one terminal end thereof. The polymerizable functional group bonded to the one terminal end is preferably an acryloyloxy group or a methacryloyloxy group. When these functional groups are copolymerized with the other components, it is possible to produce the water-insoluble graft polymer containing the constitutional unit derived from the styrene-based macromer.

The content of the constitutional unit derived from the styrene-based monomer in the side chain or in the styrene-based macromer is preferably 60% by weight or more, more preferably 70% by weight or more and still more preferably 90% by weight or more in view of a good rubbing resistance.

The styrene-based macromer is commercially available, for example, from Toagosei Co., Ltd., as product names of AS-6, AS-6S, AN-6, AN-6S, HS-6, HS-6S, etc.

Alkyl(meth)acrylate-Based Macromer (b-2)

The alkyl(meth)acrylate-based macromer means such a macromer which contains a constitutional unit derived from the (meth)acrylate containing an alkyl group having 1 to 22 carbon atoms and preferably 1 to 18 carbon atoms which may also contain a hydroxyl group (hereinafter referred to merely as the "monomer (b-2)").

Specific examples of the (meth)acrylate include methyl (meth)acrylate, ethyl (meth)acrylate, (iso)propyl (meth)acrylate, 2-hydroxyethyl (meth)acrylate, (iso- or tertiary-)butyl (meth)acrylate, 2-ethylhexyl (meth)acrylate, (iso)octyl (meth)acrylate, (iso)decyl (meth)acrylate and (iso)stearyl (meth)acrylate.

The side chain containing the constitutional unit derived from the monomer (b-2) may be produced by copolymerizing the alkyl(meth)acrylate-based macromer having a polymerizable functional group at one terminal end thereof. Examples of the alkyl(meth)acrylate-based macromer include a methyl methacrylate-based macromer, a butyl acrylate-based macromer, an isobutyl methacrylate-based macromer and a lauryl methacrylate-based macromer.

These alkyl(meth)acrylate-based macromers may be homopolymers of the alkyl(meth)acrylate having a polymerizable functional group at one terminal end thereof, or copolymers of the alkyl(meth)acrylate with the other monomer which have a polymerizable functional group at one terminal end thereof. The polymerizable functional group bonded to the one terminal end is preferably an acryloyloxy group or a methacryloyloxy group. Examples of the other monomer copolymerizable with the alkyl(meth)acrylate include the above-mentioned styrene-based monomers (1) (monomers (b-1)) and the below-mentioned aromatic ring-containing (meth)acrylate-based monomers (3) other than styrene (monomer (b-3)).

In the side chain or the alkyl(meth)acrylate macromer, the content of the constitutional unit derived from the (meth)acrylate is largest, and preferably 60% by weight or more, more preferably 70% by weight or more and still more preferably 90% by weight or more in view of a good rubbing resistance.

Aromatic Ring-Containing (Meth)acrylate-Based Macromer (b-3)

The aromatic ring-containing (meth)acrylate-based macromer means such a macromer containing a constitutional unit derived from the aromatic ring-containing (meth)acrylate as the monomer (b-3). The aromatic ring-containing (meth)acrylate is preferably a monomer represented by the above general formula (1-1):

$$CH_2=CR^1COOR^2 \quad (1\text{-}1)$$

wherein $R^1$ and $R^2$ are respectively the same as defined above.

Specific examples of the aromatic ring-containing (meth) acrylate include benzyl (meth)acrylate, phenyl (meth)acrylate, 2-phenylethyl (meth)acrylate, phenoxyethyl (meth) acrylate, 1-naphthyl acrylate, 2-naphthyl (meth)acrylate, phthalimidomethyl (meth)acrylate, p-nitrophenyl (meth) acrylate, 2-hydroxy-3-phenoxypropyl (meth)acrylate, 2-methacryloyloxyethyl-2-hydroxypropyl phthalate and 2-acryloyloxyethyl phthalate. Among these the aromatic ring-containing (meth)acrylates, especially preferred is benzyl (meth)acrylate. These the aromatic ring-containing (meth)acrylates may be used alone or in combination of any two or more thereof.

The side chain containing the constitutional unit derived from the aromatic ring-containing (meth)acrylate may be produced by copolymerizing the aromatic ring-containing (meth)acrylate-based macromer having a polymerizable functional group at one terminal end thereof.

Examples of the aromatic ring-containing (meth)acrylate-based macromer include homopolymers of the aromatic ring-containing (meth)acrylate having a polymerizable functional group at one terminal end thereof, and copolymers of the aromatic ring-containing (meth)acrylate with the other monomer which have a polymerizable functional group at one terminal end thereof. The polymerizable functional group bonded to one terminal end of the macromer is preferably an acryloyloxy group or a methacryloyloxy group. Examples of the other monomer copolymerizable with the aromatic ring-containing (meth)acrylate include (1) the above-mentioned styrene-based monomers as the monomer (b-1) and (2) the (meth)acrylates as the monomer (b-2).

In the side chain or the aromatic ring-containing (meth) acrylate-based macromer, the constitutional unit derived from the aromatic ring-containing (meth)acrylate has a largest content.

Silicone-Based Macromer (b-4)

The water-insoluble graft polymer used in the present invention may further contain an organopolysiloxane chain as the side chain thereof. Such a side chain is preferably produced, for example, by copolymerizing a silicone-based macromer having a polymerizable functional group at one terminal end thereof which is represented by the following general formula (5):

(5)

wherein t is a number of 8 to 40.

When the polymer used in the present invention is the water-insoluble graft polymer, the weight ratio of a main chain of the polymer to a side chain thereof [main chain/side chain] is preferably from 1/1 to 20/1, more preferably from 3/2 to 15/1 and still more preferably from 2/1 to 10/1 in view of enhancing a dispersion stability. Meanwhile, the weight ratio is calculated assuming that the polymerizable functional group is contained in the side chain.

Among the above macromers, the styrene-based macromers having a polymerizable functional group at one terminal end thereof are preferred in view of a high affinity to the colorant and an enhanced dispersion stability.

Meanwhile, the terms "(iso- or tertiary-)" and "(iso)" used herein mean both the case where the branched structure expressed by "iso" or "tertiary" is present, and the case where such a branched structure is not present (namely, "normal").

The water-insoluble polymer preferably further contains a constitutional unit derived from a hydrophobic monomer (c) in view of enhancing a dispersion stability, an optical density and a high lighter-fastness.

The constitutional unit derived from the hydrophobic monomer (c) can be produced by polymerizing a hydrophobic monomer. Alternatively, after completion of the polymerization, the hydrophobic monomer may be introduced into the resultant polymer chain.

The hydrophobic monomer (c) is preferably (c-1) a (meth) acrylate containing an alkyl group having 1 to 22 carbon atoms, or (c-2) a monomer represented by the following general formula (6):

$$CH_2=C(R^7)-R^8 \qquad (6)$$

wherein $R^7$ is a hydrogen atom or an alkyl group having 1 to 5 carbon atoms; and $R^8$ is an aromatic ring-containing hydrocarbon group having 6 to 22 carbon atoms.

Examples of the (meth)acrylate (c-1) containing an alkyl group having 1 to 22 carbon atoms include methyl (meth)acrylate, ethyl (meth)acrylate, (iso)propyl (meth)acrylate, (iso- or tertiary-)butyl (meth)acrylate, 2-ethylhexyl (meth)acrylate, (iso)octyl (meth)acrylate, (iso)decyl (meth)acrylate, (iso)dodecyl (meth)acrylate, (iso)stearyl (meth)acrylate and behenyl (meth)acrylate.

As the monomer (c-2) represented by the above general formula (6), in view of a good optical density, there is preferably used at least one monomer selected from the group consisting of styrene, vinyl naphthalene, α-methyl styrene, vinyl toluene, ethylvinyl benzene, 4-vinyl biphenyl and 1,1-diphenyl ethylene. Among these monomers, at least one styrene-based monomer selected from the group consisting of styrene, α-methyl styrene and vinyl toluene is preferred in view of a good optical density and a good storage stability of the resultant dispersion or ink.

The water-insoluble polymer used in the present invention may further contain other constitutional units.

The water-insoluble polymer used in the present invention preferably contains the constitutional unit represented by the above formula (1) and further the constitutional unit represented by the above formula (2). The water-insoluble polymer is preferably produced by copolymerizing a monomer mixture containing the monomer represented by the above formula (1-1) and the monomer represented by the above formula (2-1) which may further contain the salt-forming group-containing monomer (a), the macromer (b) and/or the hydrophobic monomer (c), etc., if required (hereinafter referred to merely as a "monomer mixture").

The content of the monomer represented by the above general formula (1-1) in the monomer mixture or the content of the constitutional unit represented by the above general formula (1) in the water-insoluble polymer is 10% by weight or more, preferably from 10 to 80% by weight, more preferably from 20 to 80% by weight and still more preferably from 25 to 75% by weight in view of enhancing an optical density and a gloss of the resultant water-based ink as well as good fixing property and dispersion stability thereof.

The content of the monomer represented by the above general formula (2-1) in the monomer mixture or the content of the constitutional unit represented by the above general formula (2) in the water-insoluble polymer is preferably from 5 to 60% by weight, more preferably from 8 to 55% by weight and still more preferably from 10 to 50% by weight in view of enhancing an optical density and a gloss of the resultant water-based ink as well as good fixing property and dispersion stability thereof The content of the salt-forming group-containing monomer (a) in the monomer mixture (hereinafter, it shall be calculated as a non-neutralized amount of a salt-forming group-containing monomer) or the content of the constitutional unit derived from the salt-forming group-containing monomer (a) in the water-insoluble polymer is preferably from 3 to 30% by weight, more preferably from 5 to 25% by weight and still more preferably from 5 to 20% by weight in view of enhancing an optical density and a gloss of the resultant water-based ink as well as a good dispersion stability thereof.

The weight ratio [(1)/(a)] of the constitutional unit represented by the general formula (1) to the constitutional unit derived from the salt-forming group-containing monomer (a) is preferably from 10/1 to 1/1 and more preferably from 8/1 to 2/1 in view of enhancing a dispersibility of the water-insoluble polymer and a gloss of the resultant water-based ink.

The weight ratio [(2)/(a)] of the constitutional unit represented by the general formula (2) to the constitutional unit derived from the salt-forming group-containing monomer (a) is preferably from 10/1 to 1/1 and more preferably from 5/1 to 1/1 in view of enhancing a dispersibility of the water-insoluble polymer and an optical density of the resultant water-based ink.

The content of the macromer (b) in the monomer mixture, or the content of the constitutional unit derived from the macromer (b) in the water-insoluble polymer is preferably from 0 to 40% by weight, more preferably from 5 to 35% by weight and still more preferably from 5 to 30% by weight in view of a good optical density of the resultant water-based ink.

The content of the hydrophobic monomer (c) in the monomer mixture, or the content of the constitutional unit derived from the hydrophobic monomer (c) in the water-insoluble polymer is preferably from 0 to 40% by weight and more preferably from 0 to 20% by weight in view of a good optical density and a good dispersion stability of the resultant water-based ink.

In the present invention, the water-insoluble polymer containing a constitutional unit derived from the salt-forming group-containing monomer is used after neutralizing the salt-forming group with the below-mentioned neutralizing agent. The degree of neutralization of the salt-forming group is preferably from 10 to 200%, more preferably from 20 to 150% and still more preferably from 50 to 150%.

When the salt-forming group is an anionic group, the degree of neutralization is calculated according to the following formula:

{[weight (g) of neutralizing agent/equivalent of neutralizing agent]/[acid value of polymer (KOH mg/g)×weight (g) of polymer/(56×1,000)]}×100

When the salt-forming group is a cationic group, the degree of neutralization is calculated according to the following formula:

{[weight (g) of neutralizing agent/equivalent of neutralizing agent]/[amine value of polymer (HCl mg/g)×weight (g) of polymer/(36.5×1,000)]}×100

The acid value or amine value may be calculated from the respective constitutional units of the water-insoluble polymer, or may also be determined by the method of subjecting a solution prepared by dissolving the polymer in an appropriate solvent such as methyl ethyl ketone to titration.

The weight-average molecular weight of the water-insoluble polymer used in the present invention is preferably from 5,000 to 500,000, more preferably from 10,000 to 400,000 and still more preferably from 10,000 to 300,000 in view of a good dispersion stability of the colorant as well as a good water resistance and a good ejection property of the resultant ink.

Meanwhile, the weight-average molecular weight of the water-insoluble polymer may be measured by gel permeation chromatography using dimethylformamide containing 60 mmol/L of phosphoric acid and 50 mmol/L of lithium bromide as a solvent and using polystyrene as a standard substance.

Colorant-Containing Water-Insoluble Polymer Particles (B)

The colorant-containing water-insoluble polymer particles (B) are preferably produced in the form of a water dispersion thereof through the following steps (1) and (2):

Step (1): Dispersing a mixture containing the water-insoluble polymer, an organic solvent, a colorant and water as well as a neutralizing agent, if required.

Step (2): Removing the organic solvent from the resultant dispersion.

In the step (1), first, the water-insoluble polymer is dissolved in the organic solvent, and then the colorant and water together with optional components such as a neutralizing agent, a surfactant, etc., if required, are added and mixed in the resultant organic solvent solution to obtain a dispersion of an oil-in-water type. The content of the colorant in the mixture is preferably from 5 to 50% by weight. The content of the organic solvent in the mixture is preferably from 10 to 70% by weight. The content of the water-insoluble polymer in the mixture is preferably from 2 to 40% by weight, and the content of water in the mixture is preferably from 10 to 70% by weight. The water-insoluble polymer containing a salt-forming group is preferably neutralized with a neutralizing agent. The degree of neutralization of the salt-forming group in the polymer is not particularly limited. In general, the degree of neutralization is preferably controlled such that the finally obtained water dispersion exhibits a neutral liquid property, for example, a pH of 4.5 to 10. The pH of the dispersion may also be determined from a desired degree of neutralization for the water-insoluble polymer.

Examples of the preferred organic solvents include alcohol solvents, ketone solvents and ether solvents, i.e., the organic solvents are preferably those having a solubility in water of 50% by weight or less but 10% by weight or more as measured at 20° C.

Examples of the alcohol solvents include ethanol, isopropanol, n-butanol, tertiary butanol, isobutanol and diacetone alcohol. Examples of the ketone solvents include acetone, methyl ethyl ketone, diethyl ketone and methyl isobutyl ketone. Examples of the ether solvents include dibutyl ether, tetrahydrofuran and dioxane. Among these solvents, preferred are isopropanol, acetone and methyl ethyl ketone, and more preferred is methyl ethyl ketone. These solvents may be used alone or in the form of a mixture of any two or more thereof.

As the neutralizing agent, acids or bases may be selectively used according to the kind of salt-forming group contained in the water-insoluble polymer.

Specific examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine and triethanolamine.

The method for dispersing the mixture used in the step (1) is not particularly limited. Preferably, the mixture is first subjected to preliminary dispersion procedure, and then to the substantial dispersion procedure by applying a shear stress thereto. In the step (2), the solids contained in the dispersion are finely divided so as to produce the water-insoluble polymer particles having a desired average particle size.

Upon subjecting the mixture to the preliminary dispersion procedure, there may be used ordinary mixing or stirring devices such as anchor blades. Examples of the preferred mixing or stirring devices include high-speed mixers or stirrers such as "Ultra Disper" (tradename: available from Asada Tekko Co., Ltd.), "Ebara Milder" (tradename: available from Ebara Corp.), "TK Homomixer", "TK Pipeline Mixer", "TK Homo Jetter", "TK Homomic Line Flow" and "Filmix" (tradenames: all available from Tokushu Kika Kogyo Co., Ltd.), "Clearmix" (tradename: available from M-Technic Co., Ltd.) and "K.D. Mill" (tradename: available from Kinetics Dispersion Inc.).

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.), "Nanomizer" (tradename: available from Nanomizer Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). Among these apparatuses, the high-pressure homogenizers are preferred in view of reducing a particle size of the pigment contained in the mixture.

In the step (2), the organic solvent is removed by distillation from the dispersion thus obtained in the above step (1) to render the dispersion aqueous or water-based, thereby obtaining a water dispersion of the colorant-containing water-insoluble polymer particles having a desired average particle size. The removal of the organic solvent from the water dispersion may be performed by an ordinary method such as distillation under reduced pressure. The organic solvent is substantially completely removed from the thus obtained water dispersion of the water-insoluble polymer particles. The content of the residual organic solvent in the water dispersion is usually 0.1% by weight or less and preferably 0.01% by weight or less. Further, the thus obtained water dispersion of the water-insoluble polymer particles is preferably passed through a filter to remove coarse particles therefrom. Although such coarse particles are usually not present or present only in a very small amount, in order to prevent clogging of nozzles in a printer, the mesh size of the filter is preferably from 1 to 10 µm and more preferably from 3 to 7 µm.

In the above water dispersion of the colorant-containing water-insoluble polymer particles, solid components made of the colorant-containing water-insoluble polymer are dispersed in water as a main solvent. The configuration of the colorant-containing water-insoluble polymer particles is not particularly limited as long as the particles are formed from at least the colorant and the water-insoluble polymer. Examples of the configuration of the colorant-containing water-insoluble polymer particles include the particle configuration in which the colorant is enclosed in the respective water-insoluble polymer particles, the particle configuration in which the colorant is uniformly dispersed in the respective water-insoluble polymer particles, and the particle configuration in which the colorant is exposed onto a surface of the respective water-insoluble polymer particles.

The average particle size of the colorant-containing water-insoluble polymer particles is preferably from 50 to 200 nm, more preferably from 70 to 170 nm and still more preferably from 90 to 150 nm in view of good dispersion stability and ejection property. The colorant-containing water-insoluble polymer particles have D90 (cumulative 90% value in frequency distribution of scattering intensity when the cumulative percentage is calculated sequentially from smaller particles) of preferably 350 nm or less, more preferably 300 nm or less and still more preferably 270 nm or less, in view of less content of coarse particles and enhanced storage stability of the water dispersion. The lower limit of D90 of the colorant-containing water-insoluble polymer particles is preferably 100 nm or more in view of facilitated production of the colorant-containing water-insoluble polymer particles. The colorant-containing water-insoluble polymer particles have D10 (cumulative 10% value in frequency distribution of scattering intensity when the cumulative percentage is calculated sequentially from smaller particles) of preferably 10 nm or more, more preferably 20 nm or more and still more preferably 30 nm or more, in view of good optical density and facilitated production of the colorant-containing water-insoluble polymer particles.

Meanwhile, the average particle size D90 and D10 may be measured using a laser particle analyzing system "ELS-8000" (cumulant analysis) available from Otsuka Electronics Co., Ltd. The measurement may be conducted under the same conditions as described above.

Water Dispersion for Ink-Jet Printing and Water-Based Ink

The water-based ink according to each of the first and second preferred embodiments of the present invention is an ink containing water as a main dispersing medium, and may further contain, if required, various additives such as a wetting agent, a dispersant, a defoaming agent, a. mildew-proof agent and a chelating agent. The method of mixing the respective components is not particularly limited.

In the water dispersion for ink-jet printing and the water-based ink according to the first preferred embodiment of the present invention as well as the water-based ink for ink-jet printing according to the second preferred embodiment of the present invention, the contents of the respective components are as follows.

In the water dispersion and the water-based ink according to the first preferred embodiment of the present invention, the content of the particles (A) (except for pigments) is preferably 0.1% by weight or more, more preferably from 0.5% by weight or more, still more preferably 1% by weight or more, further still more preferably 3% by weight or more and most preferably 5% by weight or more. The upper limit of the content of the particles (A) is preferably 25% by weight or less, more preferably 20% by weight or less and still more preferably 15% by weight or less. From these viewpoints, the content of the particles (A) is preferably in the range of from 0.1 to 25% by weight, more preferably from 0.5 to 20% by weight, still more preferably from 1 to 20% by weight, further still more preferably from 3 to 15% by weight and most preferably from 5 to 15% by weight. The total content of the nonionic organic compound in the water dispersion and water-based ink according to the first preferred embodiment of the present invention is preferably 0.1% by weight or more, more preferably from 0.3% by weight or more and still more preferably 0.5% by weight or more. The upper limit of the content of the nonionic organic compound is preferably 3% by weight or less, more preferably 2% by weight or less and still more preferably 1.5% or less. From these viewpoints, the content of the nonionic organic compound is preferably in the range of from 0.1 to 3% by weight, more preferably from 0.3 to 2% by weight and still more preferably from 0.5 to 1.5% by weight.

In the water-based ink according to the second preferred embodiment of the present invention, the content of the particles (A) is preferably 0.1% by weight or more, more preferably from 0.5% by weight or more, still more preferably 1% by weight or more, further still more preferably 3% by weight or more and most preferably 5% by weight or more. The upper limit of the content of the particles (A) is preferably 25% by weight or less, more preferably 20% by weight or less and still more preferably 15% by weight or less. From these viewpoints, the content of the particles (A) is preferably in the range of from 0.1 to 25% by weight, more preferably from 0.5 to 20% by weight, still more preferably from 1 to 20% by weight, further still more preferably from 3 to 15% by weight and most preferably from 5 to 15% by weight. The content of the ndnionic organic compound in the water-based ink according to the second preferred embodiment of the present invention is preferably 0.1% by weight or more, more preferably from 0.3% by weight or more and still more preferably 0.5% by weight or more. The upper limit of the content of the nonionic organic compound is preferably 3% by weight or less, more preferably 2% by weight or less and still more preferably 1.5% or less. From these viewpoints, the content of the nonionic organic compound is preferably in the range of from 0.1 to 3% by weight, more preferably from 0.3 to 2% by weight and still more preferably from 0.5 to 1.5% by weight.

When the colorant is contained in the water-insoluble polymer particles, the content (solid content) of the colorant-containing water-insoluble polymer particles in the water-based inks according to the first and second preferred embodiments of the present invention is preferably controlled to the range of from 0.5 to 20% by weight and more preferably from 1 to 15% by weight in view of a good optical density and a good ejection stability. In the water dispersion according to the first preferred embodiment of the present invention, the content (solid content) of the colorant-containing water-insoluble polymer particles is preferably in the range of from 5 to 35% by weight and more preferably from 10 to 25% by weight.

The weight ratios of the respective components in the water dispersion and the water-based ink according to the first preferred embodiment of the present invention are as follows.

The weight ratio of the nonionic organic compound to the water-insoluble polymer (content of the nonionic organic compound/content of the water-insoluble polymer) is preferably from 1/10 to 2/1, more preferably from 1/5 to 3/2 and still more preferably from 1/4 to 1/1 in order to readily spread the colorant-containing water-insoluble polymer particles over a printing paper.

The weight ratio of the nonionic organic compound to the particles (A) (content of the nonionic organic compound/content of the particles (A)) is preferably from 1/1 to 1/20, more preferably from 1/3 to 1/15 and still more preferably from 1/5 to 1/13 in view of a good balance between the effect of promoting a wetting spreadability on a surface of the printing paper to prevent the water-based ink from penetrating to an inside of the paper, and the effect of reducing an amount of light reflected from the printed images.

The weight ratio of the colorant to the particles (A) (content of the colorant/content of the particles (A)) is preferably from 1/10 to 3/1, more preferably from 1/10 to 2/1 and still more preferably from 1/5 to 1/1 in view of attaining a good dispersion stability of the particles (A) and reducing an amount of light reflected from the particles (A).

Also, in the water-based ink according to the second preferred embodiment of the present invention, the weight ratio of the nonionic organic compound to the water-insoluble polymer (content of the nonionic organic compound/content of the water-insoluble polymer) is preferably from 1/10 to 2/1, more preferably from 1/5 to 3/2 and still more preferably from 1/4 to 1/1 in order to readily spread the colorant-containing water-insoluble polymer particles over a printing paper.

The weight ratio of the nonionic organic compound to the particles (A) (content of the nonionic organic compound/content of the particles (A)) in the water-based ink according to the second preferred embodiment of the present invention is preferably from 1/1 to 1/20, more preferably from 1/3 to 1/15 and still more preferably from 1/5 to 1/13 in view of a good balance between the effect of promoting a wetting spreadability on a surface of the printing paper to prevent the water-based ink from penetrating to an inside of the paper, and the effect of reducing an amount of light reflected from the printed images.

The weight ratio of the colorant to the particles (A) (content of the colorant/content of the particles (A)) in the water-based ink according to the second preferred embodiment of the present invention is preferably from 1/10 to 3/1, more preferably from 1/10 to 2/1 and still more preferably from 1/5 to 1/1 in view of attaining a good dispersion stability of the particles (A) and reducing an amount of light reflected from the particles (A).

The content of water in the water dispersion and the water-based ink of the present invention is preferably from 30 to 90% by weight and more preferably from 40 to 80% by weight.

The colorant contained in the water-based ink for ink-jet printing according to the present invention preferably has an average penetration depth of 60 μm or less when solid image printing (100% Duty solid printing) is carried out on a plain paper (tradename: "4024" available from Xerox Corp.) by using the water-based ink and a printer available from Seiko Epson Corp., (tradename: "EM-930C"; nozzle diameter: ϕ38 μm; resolution: 360 dpi; ejection frequency: 14.4 kHz; printing mode: "Fine"; printing speed: 9.2 ppm; amount of ink droplet: 40 pl). The average penetration depth used herein may be measured by the method as described in Examples below.

The average penetration depth of the colorant is preferably 60 μm or less, more preferably 50 μm or less and still more preferably 45 μm or less in view of enhancing the optical density. The lower limit of the average penetration depth of the colorant is preferably 10 μm or more and more preferably 20 μm or more in view of a good rubbing resistance. From these viewpoints, the average penetration depth of the colorant is preferably in the range of from 10 to 60 μm, more preferably from 20 to 50 μm and still more preferably from 20 to 45 μm.

Ink-Jet Printing Method

The water-based ink for ink-jet printing according to the present invention is suitably used for the ink-jet printing method in which ink-jet printing is performed in an one-pass printing manner. The one-pass printing means that in the case of a line head type ink-jet printer in which a scanning direction of an ink-jet head is consistent with a delivery direction of a printing medium, images are formed at one scanning operation, whereas in the case of a serial head type ink-jet printer in which scanning of the ink-jet head is carried out in two directions, images are formed while delivering a printing medium in a direction perpendicular to the scanning direction of the ink-jet head substantially without allowing an ink shot to impinge against the previous ink shot on the printing medium (i.e., no overlapped ink shots).

Upon the one-pass printing, the number of ink droplets injected from ink-jet nozzles per unit area is reduced. Therefore, the size of one ink droplet used in the one-pass printing is large as compared to printing methods using several passes. A large-dot ink droplet is fluctuated in an amount of ink per unit area as compared to several small-dot ink droplets. Therefore, there is present a very small portion on the printing paper where the amount of ink is large and therefore the ink tends to readily penetrate into the paper. On the contrary, the water-based ink of the present invention is promoted in wetting spreadability over a surface of the printing paper and is prevented from penetrating to an inside of the paper. As a result, the water-based ink of the present invention is suitably used for the one-pass printing method.

EXAMPLES

In the following synthesis examples, production examples, examples and comparative examples, the "part(s)" and "%" indicate "part(s) by weight" and "% by weight", respectively, unless otherwise specified.

Synthesis Example 1

Twenty parts of methyl ethyl ketone and 0.03 part of a chain transfer agent (2-mercaptoethanol) together with 10% of 200 parts of a mixture of respective monomers shown in Table 1 below were charged into a reaction vessel and mixed with each other, and then the reaction vessel was fully purged with a nitrogen gas to thereby obtain a mixed solution.

Separately, remaining 90% of the monomer mixture shown in Table 1 was charged into a dropping funnel, and further 0.27 part of the chain transfer agent, 60 parts of methyl ethyl ketone and 1.2 parts of a radical polymerization initiator (2,2'-azobis(2,4-dimethyl valeronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h at 65° C. from completion of the dropping, a solution prepared by dissolving 0.3 part of the radical polymerization initiator in 5 parts of methyl ethyl ketone was added to the above obtained reaction solution, and the resultant solution was aged at 65° C. for 2 h and further at 70° C. for 2 h to obtain a polymer solution.

Meanwhile, details of the compounds shown in Table 1 are as follows.

Styrene macromer: "AS-6S" (tradename) available from Toagosei Co., Ltd.; number-average molecular weight: 6000; polymerizable functional group: methacryloyloxy group; purity: 50%

Polyethylene glycol monomethacrylate (molar number of addition of ethyleneoxide: 9 mol in average): "NK Ester M-90G" (tradename) available from Shin-Nakamura Chemical Co., Ltd.; terminal group: hydrogen atom Polypropylene glycol monomethacrylate (molar number of addition of propyleneoxide: 9 mol in average): "Blemmer PP-500" (tradename) available from NOF Corporation; terminal group: hydrogen atom

TABLE 1

| Kind of Monomer (wt % as effective ingredients) | Synthesis Example 1 |
| --- | --- |
| (a) Methacrylic acid | 10 |
| (b) Styrene macromer | 15 |
| (c) Benzyl methacrylate | 40 |
| (c) Styrene monomer | 10 |

TABLE 1-continued

| Kind of Monomer (wt % as effective ingredients) | Synthesis Example 1 |
| --- | --- |
| (d) Polyethylene glycol monomethacrylate | 5 |
| (d) Polypropylene glycol monomethacrylate | 20 |
| Weight-average molecular weight | 200,000 |

Production Example 1

Twenty five parts of the polymer produced by drying the polymer solution obtained in Synthesis Example 1 under reduced pressure was dissolved in 70 parts of methyl ethyl ketone. Further, 4.1 parts of a neutralizing agent (a 5N sodium hydroxide aqueous solution) and 230 parts of ion-exchanged water were added to the resultant solution to neutralize a salt-forming group of the polymer (degree of neutralization: 75%), and then 75 parts of a quinacridone pigment (C.I. Pigment Violet 19 "Hostaperm Red E5B02" (tradename) available from Clariant Japan Co., Ltd.) was added to the reaction solution and mixed with each other at 20° C. for 1 h using disper blades. The thus obtained mixture was dispersed under a pressure of 200 MPa by passing through a dispersing apparatus "MICROFLUIDIZER" (tradename) available from Microfluidics Corp., 10 times.

The resultant dispersion was mixed with 250 parts of ion-exchanged water under stirring, and then methyl ethyl ketone was removed from the resultant mixture under reduced pressure at 60° C., followed by further removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Corporation, to remove coarse particles therefrom, thereby obtaining a water dispersion of pigment-containing vinyl polymer particles having a solid content of 20%. As a result, it was confirmed that the average particle size of the thus obtained pigment-containing vinyl polymer particles was 110 nm. Further, it was confirmed that D10 (particle size at which a cumulative value of particle size distribution as calculated sequentially from smaller particles (on the number basis) was 10%) and D90 (particle size at which a cumulative value of particle size distribution as calculated sequentially from smaller particles (on the number basis) was 90%) of the pigment-containing vinyl polymer particles were 70 nm and 171 nm, respectively.

Example 1

Forty parts of the water dispersion of pigment-containing vinyl polymer particles produced in Production Example 1, 7 parts of triethylene glycol monobutyl ether, 1 part of "SUR-FYNOL 465" available from Nissin Chemical Industry Co., Ltd., 0.3 part of "Ploxel XL2" available from Avecia KK, 20 parts (10 parts as effective ingredients) of polystyrene available from Zeon Corporation, 1 part of 1,2-dodecanediol available from Tokyo Chemical Industry Co., Ltd., and 20 parts of ion-exchanged water were previously dissolved and dispersed to prepare solutions containing respective components, and then the solutions were mixed with each other. Further, glycerol and ion-exchanged water were added to the resultant mixture so as to control a viscosity of the mixture to 4 mPa·s as measured at 20° C. using an E-type viscometer, followed by fully stirring to obtain a mixed solution having a total volume of 100 parts. The resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining a water-based ink.

Examples 2 to 7

The same procedure as in Example 1 was repeated except for using the compounds shown in Table 2 in place of polystyrene as the particles (A) and 1,2-dodecanediol as the nonionic organic compound, thereby obtaining water-based inks.

Comparative Example 1

The same procedure as in Example 1 was repeated except for replacing polystyrene as the particles (A) and 1,2-dodecanediol (PO-1) as the nonionic organic compound with the same amount of ion-exchanged water, thereby obtaining a water-based ink.

Comparative Example 2

The same procedure as in Example 1 was repeated except for replacing polystyrene as the particles (A) with the same amount of ion-exchanged water, thereby obtaining a water-based ink.

Comparative Examples 3 and 4

The same procedure as in Comparative Example 2 was repeated except for replacing 1,2-dodecanediol (PO-1) with the compounds (PO-2) and (PO-3), respectively, thereby obtaining water-based inks.

Comparative Example 5

The same procedure as in Example 1 was repeated except for replacing polystyrene as the particles (A) with the same amount of ion-exchanged water and replacing 1,2-dodecanediol (PO-1) with the same amount of a coconut oil fatty acid diethanol amide (Y-1), thereby obtaining a water-based ink.

Comparative Example 6

The same procedure as in Example 1 was repeated except for replacing polystyrene as the particles (A) with titanium oxide, and replacing 1,2-dodecanediol (PO-1) with the same amount of a coconut oil fatty acid N-methyl ethanol amide (Y-2), thereby obtaining a water-based ink.

Comparative Example 7

The same procedure as in Example 3 was repeated except for replacing 1,2-dodecanediol (PO-1) as the nonionic organic compound with the same amount of ion-exchanged water, thereby obtaining a water-based ink.

The water-based inks obtained in the above Examples and Comparative Examples were evaluated by the following methods. The results are shown in Tables 2 and 3.

(1) Optical Density

Solid image printing was carried out on a plain paper "4024" (tradename) commercially available from Xerox Corp., using an ink-jet printer "Model EM930C" (piezoelectric type) available from Seiko Epson Co., Ltd., under the following printing conditions:

Kind of Paper: Plain Paper
Mode set: Fine (one pass).

After allowing the printed paper to stand at 25° C. for 24 h, the optical density thereof was measured at 5 points including a center point and 4 corner points on the printed paper (5.1 cm×8.0 cm) using a Macbeth densitometer "RD914" (product number) available from Gretag-Macbeth Corp., to calculate an average of the measured values.

(2) Method of Measuring Solubility of Nonionic Organic Compound

A predetermined amount of the nonionic organic compound was sampled at room temperature (25° C.), and ion-exchanged water at 25° C. was continuously added under stirring (about 100 rpm) to the nonionic organic compound to observe and confirm complete dissolution of the nonionic organic compound therein (colorless transparent condition of the resultant aqueous solution) by naked eyes, thereby determining a solubility of the nonionic organic compound in water. The solubility is expressed by a saturated solubility of the nonionic organic compound in 100 g of water. The stirring for the measurement was conducted within 1 h.

(3) Method of Measuring Surface Tension of Water Containing Nonionic Organic Compound A platinum plate was immersed in five grams of an aqueous solution prepared by dissolving 0.001 g of the nonionic organic compound in 100 g of water which was filled in a cylindrical polyethylene container (3.6 cm in diameter×1.2 cm in depth). Then, using a surface tension meter "CBVP-2" (tradename) available from Kyowa Interface Science Co., Ltd., a surface tension of the aqueous solution, i.e., water containing the nonionic organic compound, was measured at 25° C. When the amount of the nonionic organic compound dissolved in 100 g of water was less than 0.001 g, the surface tension thereof was measured at a maximum solubility thereof (4) Method of Measuring Surface Tension (γ)
Measured by the method described above.

(5) Method of Measuring Contact Angle (θ)
Measured by the method described above.

(6) Method of Measuring Refractive Index

A dispersion containing the particles (A) was spin-coated to form a thin film (having a thickness of about 100 μm). The resultant thin film was dried at 105° C. under a pressure of −80000 Pa for 10 h using a pressure-reducing dryer to remove the dispersing medium therefrom, and a refractive index of the thin film was measured at a wavelength of 589 nm by using a light interference type film thickness measuring apparatus "LAMBDA-ACE VM-1000" (product name) available from Dai-Nippon Screen Mfg. Co., Ltd., according to JIS K-7142-1996 (B method).

(7) Method of Measuring Average Penetration Depth

Using the water-based ink of the present invention and a printer available from Seiko Epson Corp. (tradename: "EM-930C"; nozzle diameter: ϕ38 μm; resolution: 360 dpi; ejection frequency: 14.4 kHz; printing mode: "Fine"; printing speed: 9.2 ppm; amount of ink droplet: 40 pl), solid image printing (100% Duty solid printing) was carried out on a plain paper (tradename: "4024" available from Xerox Corp.) under the following printing conditions:

Kind of Paper: Plain Paper
Mode set: Fine (one pass).

The thus printed paper is allowed to stand at 25° C. for 24 h, and a solid-printed portion thereof is cut out using a cutter to measure a penetration depth of the colorant at optional 1.0 positions on a cut section of the paper using an extra-depth profile measuring microscope "VK-8500" available from Keyence Co., Ltd., and calculate an average penetration depth from the 10 measured values.

(8) Method of Measuring Tg:

The glass transition temperature (Tg) of the polymer used in the present invention was measured by a differential scanning calorimeter "DSC6200" available from Seiko Instruments Co., Ltd. Specifically, Tg was measured under the conditions including a series of the following temperature programs 1 to 4, and the value measured at the temperature program 3 was determined as Tg of the polymer. The reason for continuously conducting the above heating and cooling temperature programs and determining the value measured at the temperature program 3 as Tg of the polymer was to ensure a reproducibility of measurement of the glass transition temperature.

Temperature Programs:
1. 30 to 250° C.: Temperature rise rate: 30° C./min; Retention time: 1 min
2. 250 to −100° C.: Cooling rate: 30° C./min; Retention time: 30 min
3. −100 to 250° C.: Temperature rise rate: 5° C./min; Retention time: 1 min
4. 250 to 30° C.: Cooling rate: 30° C./min; Retention time: 2 min (9) Method of Measuring E-type viscosity:

The measurement of the E-type viscosity was carried out using a viscometer "RE80" available from Toki Sangyo Co., Ltd., and a standard rotor (1° 34'×R24) at 20° C. and a rotating speed of 100 rpm for 1 min.

TABLE 2

|  | Examples | | | |
| --- | --- | --- | --- | --- |
|  | 1 | 2 | 3 | 4 |
| Particles (A)* | PS | FP | Silica | PTFE |
| Content of particles (A) as effective ingredient (wt %) | 10 | 10 | 10 | 10 |
| Refractive index of particles (A) | 1.59 | 1.51 | 1.45 | 1.35 |
| Average particle size of particles (A) (nm) | 160 | 180 | 220 | 270 |
| Nonionic organic compound | PO-1 | PO-1 | PO-1 | PO-1 |
| Content of nonionic organic compound as effective ingredient (wt %) | 1 | 1 | 1 | 1 |
| Surface tension of water containing nonionic organic compound (mN/m) | 47.1 | 47.1 | 47.1 | 47.1 |
| Solubility of nonionic organic compound (g/100 g) | 0.001 | 0.001 | 0.001 | 0.001 |
| Polymer | Synthesis Example 1 | Synthesis Example 1 | Synthesis Example 1 | Synthesis Example 1 |
| Surface tension (γ) of ink (mN/m) | 24.5 | 21.8 | 24.8 | 25.1 |
| Contact Angle (θ) of ink (°) | 15.0 | 14.2 | 8.8 | 12.5 |
| γcosθ | 23.7 | 21.1 | 24.5 | 24.5 |
| γ(1 − cosθ) | 0.83 | 0.67 | 0.29 | 0.59 |
| Optical density | 1.03 | 1.10 | 1.13 | 1.03 |
| Average penetration depth (μm) | 57 | 37 | 33 | 52 |

TABLE 2-continued

|  | Examples | | |
| --- | --- | --- | --- |
|  | 5 | 6 | 7 |
| Particles (A) | Silica | Silica | Silica |
| Content of particles (A) as effective ingredient (wt %) | 10 | 10 | 10 |
| Refractive index of particles (A) | 1.45 | 1.45 | 1.45 |
| Average particle size of particles (A) (nm) | 220 | 220 | 220 |
| Nonionic organic compound | PO-2 | PO-3 | PO-4 |
| Content of nonionic organic compound as effective ingredient (wt %) | 1 | 1 | 1 |
| Surface tension of water containing nonionic organic compound (mN/m) | 65 | 57.8 | 48.1 |
| Solubility of nonionic organic compound (g/100 g) | 0.15 | 0.05 | 0.12 |
| Polymer | Synthesis Example 1 | Synthesis Example 1 | Synthesis Example 1 |
| Surface tension (γ) of ink (mN/m) | 27.0 | 24.0 | 24.0 |
| Contact Angle (θ) of ink (°) | 14.2 | 16.5 | 16.5 |
| γcosθ | 26.2 | 23.0 | 23.0 |
| γ(1 − cosθ) | 0.82 | 0.99 | 0.99 |
| Optical density | 1.04 | 1.06 | 1.04 |
| Average penetration depth (μm) | 45 | 40 | 43 |

Note:
*PS: Polystyrene; FP: Fluorine-containing fine particles; PTFE: Polytetrafluoroethylene The details of the substances shown in Table 2 are as follows. Nonionic organic compound:

PO-1: 1,2-Dodecanediol
PO-2: Dodecanoic acid monoglyceride
PO-3: Isodecyl monoglyceryl ether
PO-4: 2,4,7,9-Tetramethyl-5-decyne-4,7-diol Polystyrene: "Nipol LX303A" available from Zeon Corporation; concentration of effective ingredients: 50.0%

Fluorine-containing fine particles: "VINYBRANE FJ-310" available from Nissin Chemical Industry, Co., Ltd.; concentration of effective ingredients: 50.7% (Tg: 35° C.)

Silica: "MP-2040" available from Nissan Chemical Industries, Ltd.; concentration of effective ingredients: 40.8%

Polytetrafluoroethylene: "AD911" available from Asahi Glass Co., Ltd.; concentration of effective ingredients: 60.0%

TABLE 3

|  | Comparative Examples | | | |
| --- | --- | --- | --- | --- |
|  | 1 | 2 | 3 | 4 |
| Particles (A) | — | — | — | — |
| Content of particles (A) as effective ingredient (wt %) | 0 | 0 | 0 | 0 |
| Refractive index of particles (A) | — | — | — | — |
| Average particle size of particles (A) (nm) | — | — | — | — |
| Nonionic organic compound | — | PO-1 | PO-2 | PO-3 |
| Content of nonionic organic compound as effective ingredient (wt %) | 0 | 1 | 1 | 1 |
| Surface tension of water containing nonionic organic compound (mN/m) | — | 47.1 | 65 | 57.8 |
| Solubility of nonionic organic compound (g/100 g) | — | 0.001 | 0.15 | 0.05 |
| Polymer | Synthesis Example 1 | Synthesis Example 1 | Synthesis Example 1 | Synthesis Example 1 |
| Surface tension (γ) of ink (mN/m) | 29.1 | 24.9 | 27.0 | 25.5 |
| Contact Angle (θ) of ink (°) | 14.5 | 14.7 | 13.9 | 16.2 |
| γcosθ | 28.2 | 24.1 | 26.2 | 24.5 |
| γ(1 − cosθ) | 0.93 | 0.82 | 0.79 | 1.01 |
| Optical density | 0.92 | 1.01 | 0.96 | 0.96 |
| Average penetration depth (μm) | 77 | 64 | 70 | 69 |

TABLE 3-continued

|  | Comparative Examples | | |
| --- | --- | --- | --- |
|  | 5 | 6 | 7 |
| Particles (A)* | — | Titanium oxide | Silica |
| Content of particles (A) as effective ingredient (wt %) | — | 10 | 10 |
| Refractive index of particles (A) | — | 2.70 | 1.45 |
| Average particle size of particles (A) (nm) | — | 222 | 220 |
| Nonionic organic compound | Y-1 | Y-2 | — |
| Content of nonionic organic compound as effective ingredient (wt %) | 1 | 1 | 0 |
| Surface tension of water containing nonionic organic compound (mN/m) | — | — | — |
| Solubility of nonionic organic compound (g/100 g) | — | — | — |
| Polymer | Synthesis Example 1 | Synthesis Example 1 | Synthesis Example 1 |
| Surface tension (γ) of ink (mN/m) | 27.5 | 28.9 | 29.0 |
| Contact Angle (θ) of ink (°) | 19.3 | 15.2 | 14.5 |
| γcosθ | 26.0 | 27.9 | 28.1 |
| γ(1 − cosθ) | 1.55 | 1.01 | 0.92 |
| Optical density | 0.95 | 0.93 | 0.98 |
| Average penetration depth (μm) | 72 | 75 | 62 |

The details of the substances shown in Table 3 are as follows.

Y-1: Coconut oil fatty acid diethanol amide: "AMIZOLE CDE" (tradename) available from Kawaken Fine Chemicals Co., Ltd.

Y-2 Coconut oil fatty acid N-methyl ethanol amide: "AMINONE C11S" (tradename) available from Kao Corp.

Titanium oxide: "AEROXIDE TiO2 P25" available from Nippon Aerogel Co., Ltd.; concentration of effective ingredients: 30.0%

From the results shown in Tables 2 and 3, it was confirmed that the water-based inks for ink-jet printing obtained in Examples 1 to 7 all were capable of producing printed images having a high optical density upon printing on plain papers as compared to the water-based ink containing neither particles (A) nor nonionic organic compound which was obtained in Comparative Example 1, the water-based inks containing no particles (A) which were obtained in Comparative Examples 2 to 5, the water-based ink containing particles having a high refractive index which was obtained in Comparative Example 6, and the water-based ink containing no nonionic organic compound which was obtained in Comparative Example 7.

Further, from the results shown in Tables 2 and 3 as well as FIG. 1, it was confirmed that when using the water-based inks having a value "γ cos θ" of 15 to 27 and a value "γ(1−cos θ)" of 0.1 to 1.3 and containing the particles (A), the resultant images printed on plain papers exhibited a high optical density.

Figure 2:
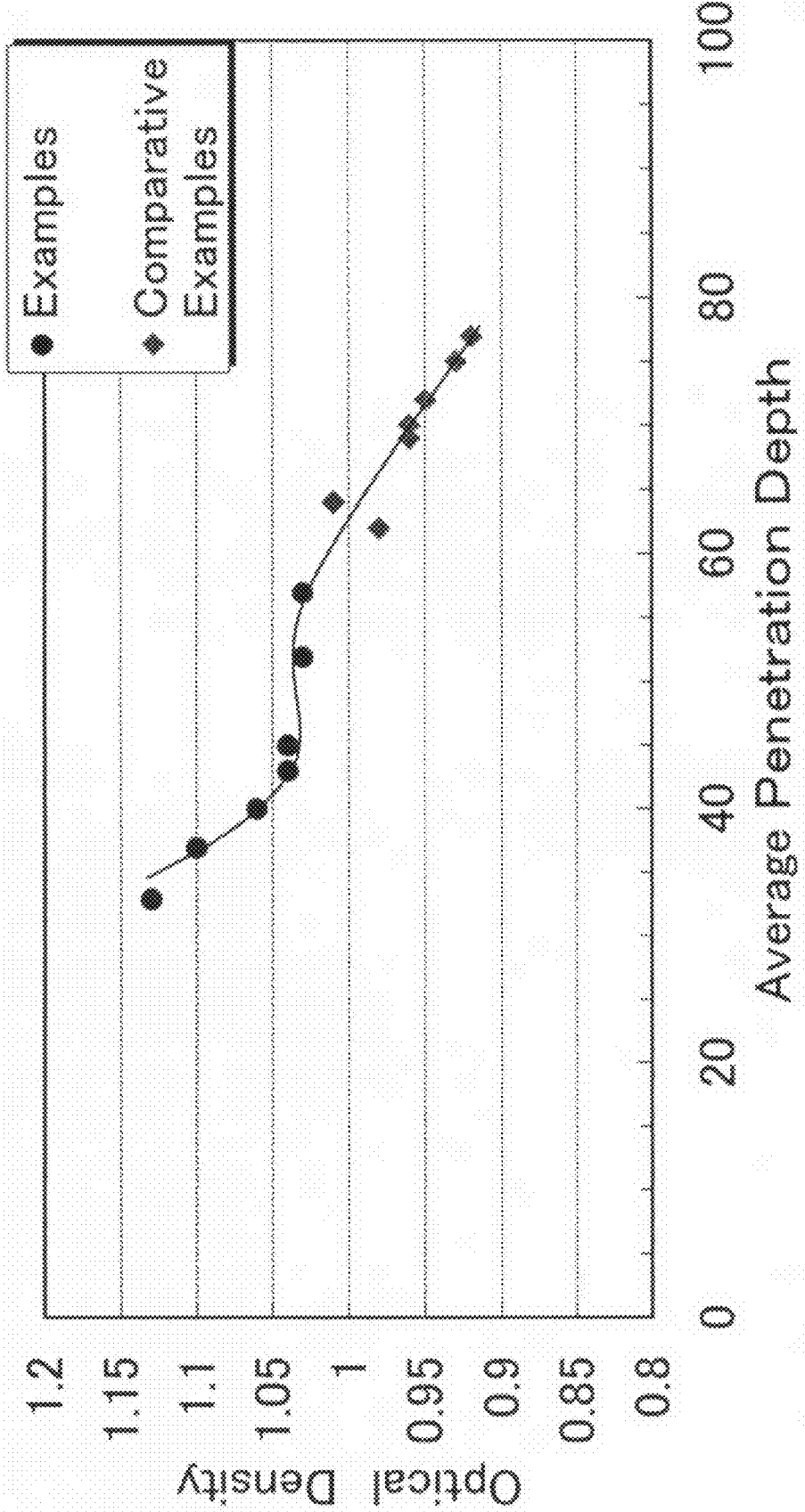
FIG. 2 is a plotting view of an average penetration depth and an optical density of the water-based inks obtained in Examples 1 to 7 and Comparative Examples 1 to 7.

In addition, from the results shown in Tables 2 and 3 as well as FIG. 2, it was confirmed that when the colorant had a penetration depth of 60 μm or less, the resultant images printed on plain papers had an optical density of 1.03 or higher.

INDUSTRIAL APPLICABILITY

The water-based ink containing the water dispersion for ink-jet printing according to the present invention can exhibit a high optical density even upon printing on a plain paper by an one-pass printing method and, therefore, is suitable as an ink for high-speed printing, and the water dispersion of the present invention can be suitably used in the water-based ink for ink-jet printing.

What is claimed is:

1. A water dispersion for ink-jet printing, comprising:
   water-insoluble polymer particles containing organic pigments,
   particles of fluorine-(meth)acrylic ester copolymers having a refractive index of 1.0 to 2.2, and
   a nonionic organic compound selected from the group consisting of the following compounds (1) to (3):
   (1) an alkane diol having 8 to 30 carbon atoms;
   (2) a fatty acid monoglyceride having 8 to 30 carbon atoms; and
   (3) monoalkyl glyceryl ether having 8 to 30 carbon atoms; and
   exhibiting a solubility of 1 g or less in 100 g of water as measured at 25° C.

2. The water dispersion according to claim 1, wherein a content of the nonionic organic compound in the water dispersion is from 0.1 to 3% by weight.

3. The water dispersion according to claim 1, wherein the particles of fluorine-(meth)acrylic ester copolymers have an average particle size of 30 to 500 nm.

4. The water dispersion according to claim 1, wherein a content of the particles of fluorine-(meth)acrylic ester copolymers in the water dispersion is from 0.1 to 25% by weight.

5. The water dispersion according to claim 1, wherein the water-insoluble polymer is a graft polymer.

6. A water-based ink for ink jet printing comprising the water dispersion as defined in claim 1.

* * * * *